(12) United States Patent
Deenoo et al.

(10) Patent No.: US 12,101,673 B2
(45) Date of Patent: Sep. 24, 2024

(54) METHODS AND APPARATUS FOR MOBILITY IN MOVING NETWORKS

(71) Applicant: InterDigital Patent Holdings, Inc., Wilmington, DE (US)

(72) Inventors: Yugeswar Deenoo, Chalfont, PA (US); Dylan Duc Watts, Montreal (CA); Diana Pani, Montreal (CA); Paul Marinier, Brossard (CA); Mouna Hajir, Montreal (CA); Ghyslain Pelletier, Montreal (CA)

(73) Assignee: INTERDIGITAL PATENT HOLDINGS, INC., Wilimington (DE)

( * ) Notice: Subject to any disclaimer, the term of this patent is extended or adjusted under 35 U.S.C. 154(b) by 0 days.

(21) Appl. No.: 18/494,385

(22) Filed: Oct. 25, 2023

(65) Prior Publication Data

US 2024/0056916 A1    Feb. 15, 2024

Related U.S. Application Data

(63) Continuation of application No. 17/289,363, filed as application No. PCT/US2019/058861 on Oct. 30, 2019, now abandoned.

(Continued)

(51) Int. Cl.
*H04W 36/00* (2009.01)
*H04B 7/185* (2006.01)
*H04W 74/0833* (2024.01)

(52) U.S. Cl.
CPC .... *H04W 36/0077* (2013.01); *H04B 7/18513* (2013.01); *H04W 74/0833* (2013.01)

(58) Field of Classification Search
CPC ......... H04W 36/0077; H04W 74/0833; H04W 36/0072; H04W 36/322; H04W 36/328;
(Continued)

(56) References Cited

U.S. PATENT DOCUMENTS 8,175,069 B2    5/2012  Wang et al.
9,225,449 B2 *  12/2015 Heo .................... H04B 7/0417
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Julio R Perez
(74) *Attorney, Agent, or Firm* — Volpe Koenig

(57) ABSTRACT

A method and apparatus for receiving a broadcast configuration indicating when a change in a RAN function termination occurs is provided, for example, by a timer value. The broadcast configuration may be received from a satellite, blimp or other moving transmitter. A dedicated configuration may also be received from the serving cell. The dedicated configuration may include a preamble, a transient configuration and an indication of a layer 2 behavior. If a WTRU detects a change in RAN function termination, the WTRU may suspend any uplink data transmissions, apply the transient configuration and transmit the preamble to a target cell. The WTRU may synchronize with the target cell and apply the layer 2 behavior.

14 Claims, 13 Drawing Sheets

Related U.S. Application Data

(60) Provisional application No. 62/840,973, filed on Apr. 30, 2019, provisional application No. 62/824,102, filed on Mar. 26, 2019, provisional application No. 62/752,722, filed on Oct. 30, 2018.

(58) Field of Classification Search
CPC ............ H04W 48/12; H04W 56/0015; H04W 74/006; H04W 88/02; H04W 84/06; H04B 7/18513; H04B 7/1851
See application file for complete search history.

(56) References Cited

U.S. PATENT DOCUMENTS

| | | | |
|---|---|---|---|
| 9,414,409 B2* | 8/2016 | Kim | H04W 36/0072 |
| 9,603,048 B2* | 3/2017 | Pelletier | H04W 28/0284 |
| 11,419,173 B2* | 8/2022 | Deenoo | H04W 76/16 |
| 11,528,765 B2* | 12/2022 | Kim | H04W 76/15 |
| 11,622,307 B2* | 4/2023 | Hassan Hussein | H04W 36/00835 370/331 |
| 11,683,088 B2* | 6/2023 | Edge | H04W 16/28 455/422.1 |
| 11,689,283 B1* | 6/2023 | Efthyvoulos | H04B 10/1129 398/119 |
| 11,995,691 B2* | 5/2024 | Rosenfeld | G06Q 30/0623 |
| 2017/0064628 A1 | 3/2017 | Wang et al. | |
| 2017/0245318 A1* | 8/2017 | Rayavarapu | H04W 76/27 |
| 2018/0288665 A1* | 10/2018 | Masini | H04W 36/1446 |
| 2019/0174571 A1 | 6/2019 | Deenoo et al. | |
| 2021/0377825 A1* | 12/2021 | Deenoo | H04W 36/322 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "Conditional Mobility for Non-Terrestrial Networks," 3GPP RAN WG2 Meeting #106, R2-1907840, Reno, United States (May 13-May 17, 2019).

Interdigital Inc., "Feeder-link Switch for Non-GEO Satellites in NTN," 3GPP RAN WG2 Meeting #105bis, R2-1903552, Xi'an, China (Apr. 8-12, 2019).

Interdigital Inc., "Mobility for Non-Terrestrial Networks," 3GPP RAN WG2 Meeting #105, R2-1901770, Athens, Greece (Feb. 25-Mar. 1, 2019).

Interdigital Inc., "NR Connected Mode Mobility for Non-Terrestrial Networks (NTN)," 3GPP RAN WG2 Meeting #106, R2-1907847, Reno, United States (May 13-May 17, 2019).

Thales, "Study on solutions for NR to support non-terrestrial networks (Ntn)," 3GPP TSG RAN meeting #81, RP-181598, Gold Coast, Australia (Sep. 10-13, 2018).

Thales, "Study on solutions for NR to support non-terrestrial networks (Ntn)," 3GPP TSG RAN meeting #83, RP-190710, Shenzen, China (Mar. 18-21, 2019).

Third Generation Partnership Project, "Technical Specification Group Radio Access Network; Study on New Radio (NR) to support non terrestrial networks (Release 15)," 3GPP TR 38.811 V15.0.0 (Jun. 2018).

Third Generation Partnership Project, "Technical Specification Group Radio Access Network; Study on New Radio (NR) to support non terrestrial networks (Release 15)," 3GPP TR 38.811 V15.2.0 (Sep. 2019).

Vanghi et al., *The cdma2000 System for Mobile Communications*, Prentice Hall PTR, Sections 2.2-2.2.1.3 (2004).

\* cited by examiner

Split 1 - NG RAN Architecture in Non Terrestrial Network with Bent Pipe Payload

Split 2 - NG RAN Architecture in Non Terrestrial Network with gNB-DU Processed Payload Split 3 - NG RAN Architecture in Non Terrestrial Network with gNB Processed Payload

METHODS AND APPARATUS FOR MOBILITY IN MOVING NETWORKS

CROSS-REFERENCE TO RELATED APPLICATIONS

This application is a continuation of U.S. patent application Ser. No. 17/289,363 filed on Apr. 28, 2021 which claims priority to PCT/US2019/058861 filed on Oct. 30, 2019 which claims the benefit of U.S. Provisional Application No. 62/840,973 filed on Apr. 30, 2019, U.S. Provisional Application No. 62/824,102 filed on Mar. 26, 2019, and U.S. Provisional Application No. 62/752,722 filed on Oct. 30, 2018, the contents of each of which are incorporated herein by reference.

BACKGROUND

Next generation air interfaces, such as long term evolution (LTE) Advanced Pro and New Radio (NR), may support a wide range of use cases with varying service requirements. Examples of such use cases may include low overhead low data rate power efficient services for massive machine type communication (mMTC), ultra-reliable low latency (URLLC) services and high data rate mobile broadband (eMBB) services. Such use cases may be supported for wireless transmit/receive units (WTRUs) with diverse capabilities, such as low power low bandwidth WTRUs, WTRUs capable of operating on very wide bandwidths, for example, an 80 Mhz bandwidth and WTRUs that support high frequencies greater than 6 Ghz, under various mobility scenarios. Such mobility scenarios include fixed, stationary and high speed train mobility scenarios. Such use cases may employ an architecture that is flexible enough to adapt to diverse deployment scenarios, such as standalone, non-standalone with assistance from a different air interface, centralized, virtualized and distributed over ideal or non-ideal backhaul scenarios.

As described herein, a network may refer to one or more next generation NodeBs (gNodeBs or gNBs), which may be associated with one or more transmission/reception points (TRPs) or other nodes in a radio access network (RAN). One example network is a non-terrestrial network (NTN), which may foster roll out of 5G services in unserved areas, such as isolated remote areas, rural areas, and vessels in oceans. These example services may be provided to WTRUs which may not be covered by terrestrial 5G networks. In some cases, NTNs may be used to upgrade the performance of terrestrial networks in underserved areas in a cost efficient manner. NTNs may also be used to reinforce 5G service reliability, ensure service availability and provide scalability for 5G deployments, for example, when a gNB or gateway is in range of the WTRU.

SUMMARY

A method and apparatus for receiving a broadcast configuration indicating when a change in a RAN function termination occurs is provided, for example, by a timer value. The broadcast configuration may be received from a satellite, blimp or other moving transmitter. A dedicated configuration may also be received from the serving cell. The dedicated configuration may include a preamble, a transient configuration and an indication of a layer 2 behavior. If a WTRU detects a change in RAN function termination, the WTRU may suspend any uplink data transmissions, apply the transient configuration and transmit the preamble to a target cell. The WTRU may synchronize with the target cell and apply the layer 2 behavior.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
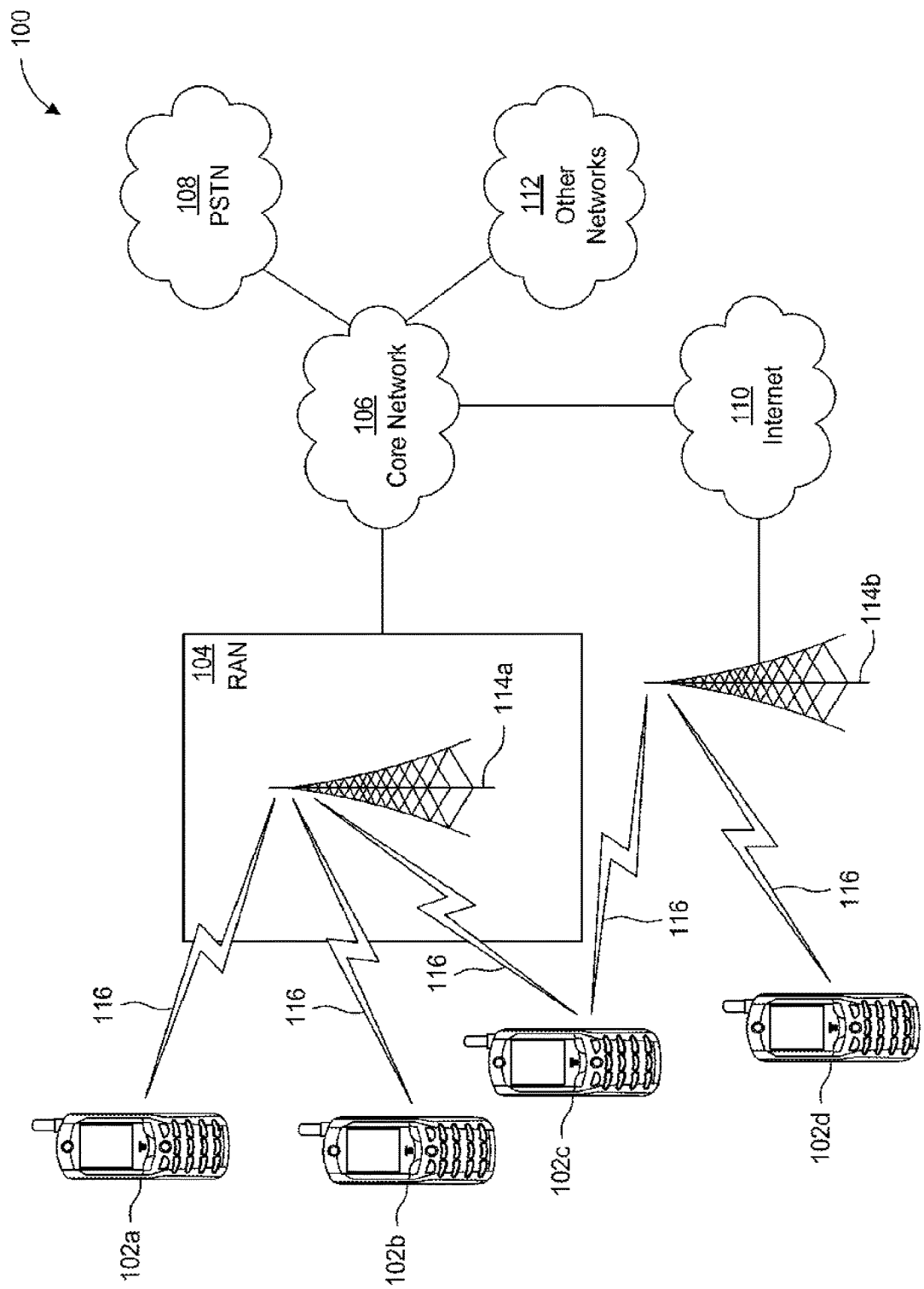
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a g NB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
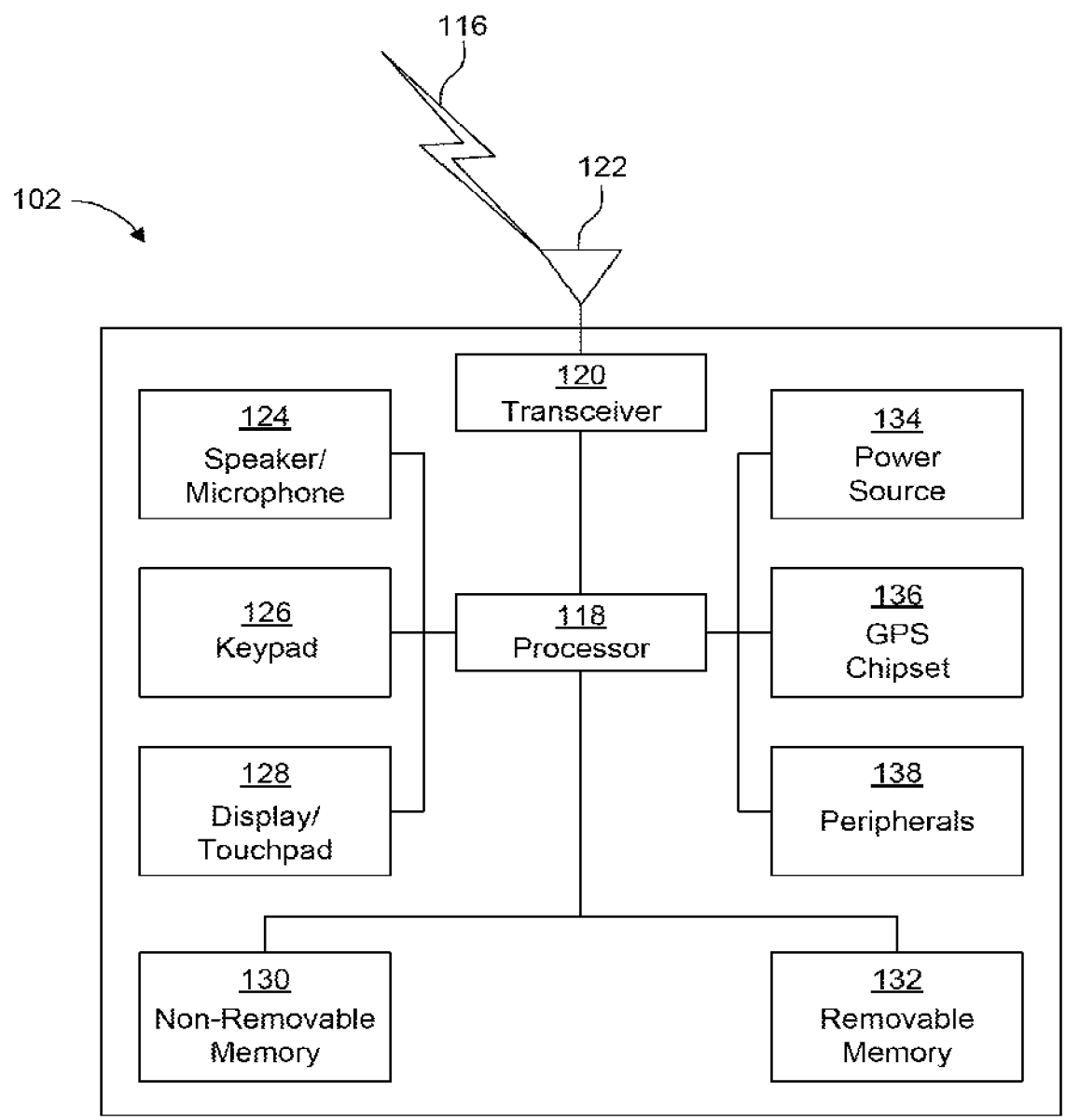
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
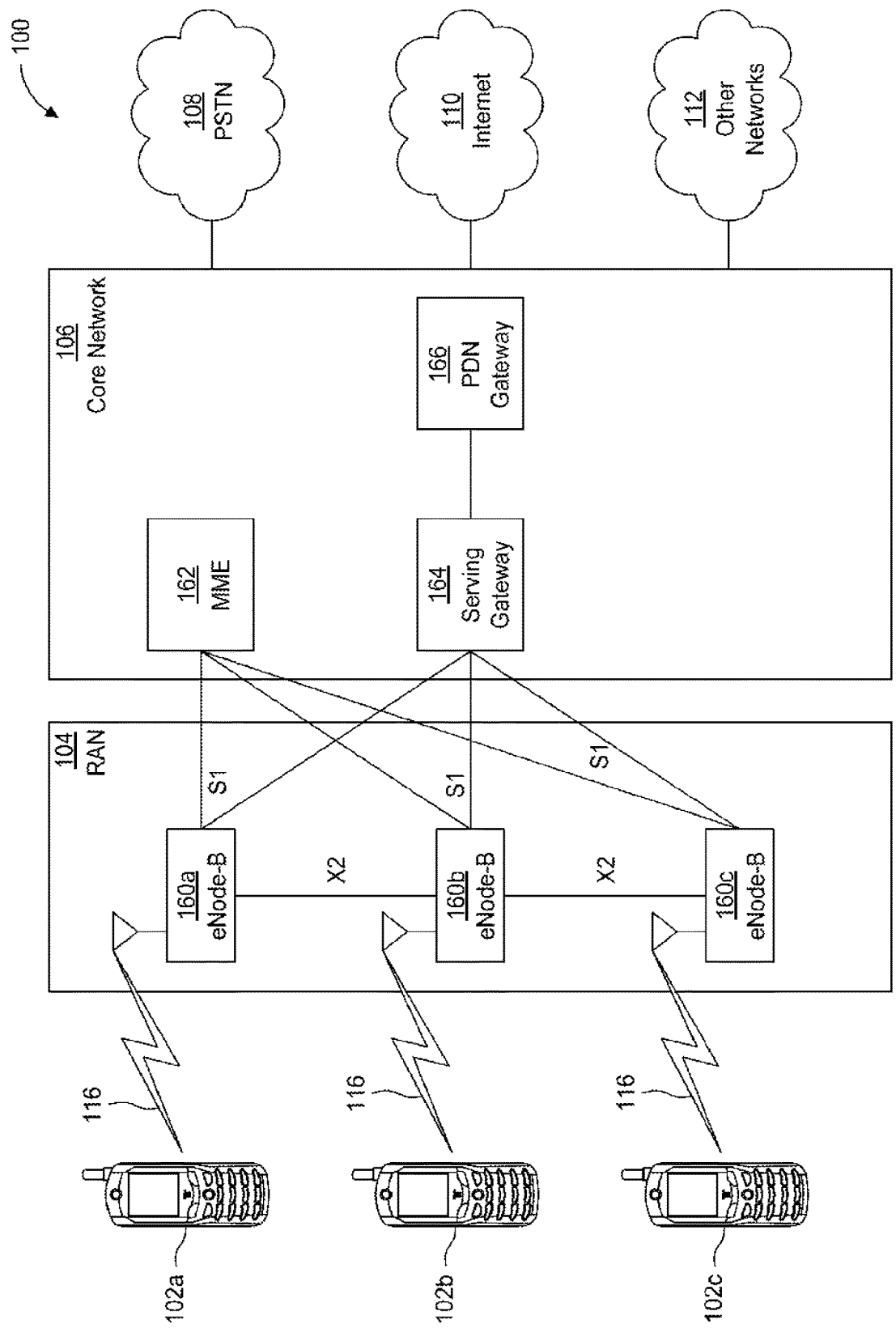
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement M IMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular SGW during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
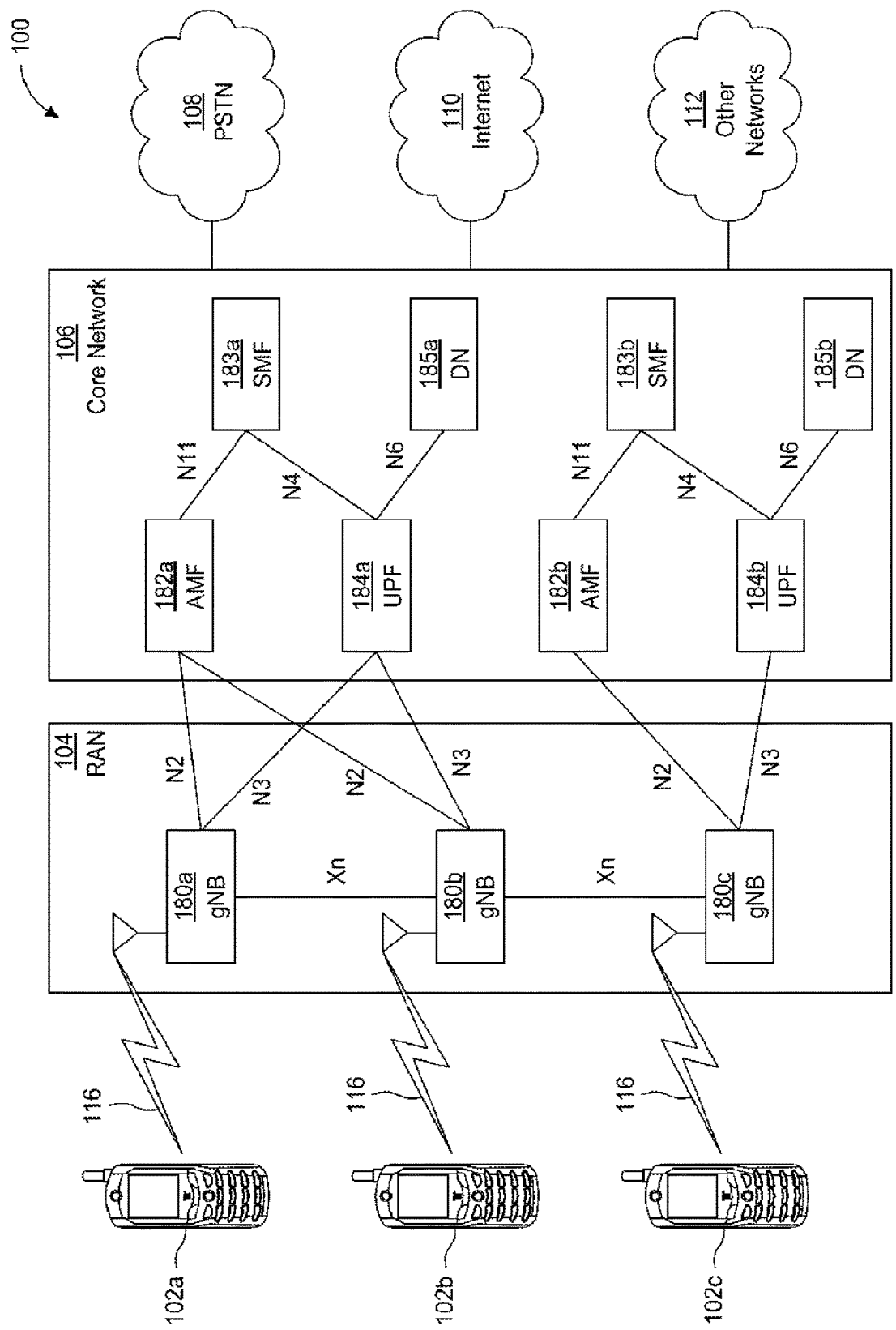
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gN Bs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

For air interfaces, such as the next generation air interfaces described above, beamforming may be used to compensate for increased pathloss at higher frequencies, for example, frequencies >6 GHz. A large number of antenna elements may be used to achieve higher beamforming gain. Analog and/or hybrid beamforming may be used to reduce implementation cost by reducing the number of RF chains and may use beams that are multiplexed in time.

Satellites may operate in a bent pipe fashion and may employ bent pipe architectures. In this way, satellites may act as radio relay stations and may not be configured to process higher network layers. Instead, satellites may relay a signal back to Earth, i.e. sends a same signal back with only amplification and/or a change in frequency or frequency band. Alternatively, satellites may incorporate onboard processing of higher layers and may perform demodulation, decoding, re-encoding and modulation before transmission.

Figure 2:
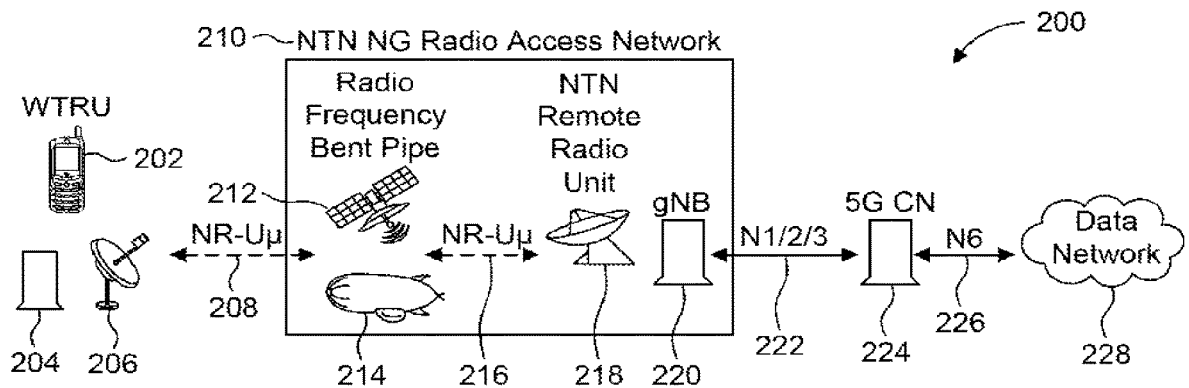
FIG. 2 is a network diagram showing different types of architectures that may be used for non-terrestrial networks (NTNs) based on RAN functional split between a ground unit and a satellite.
Figure 2:
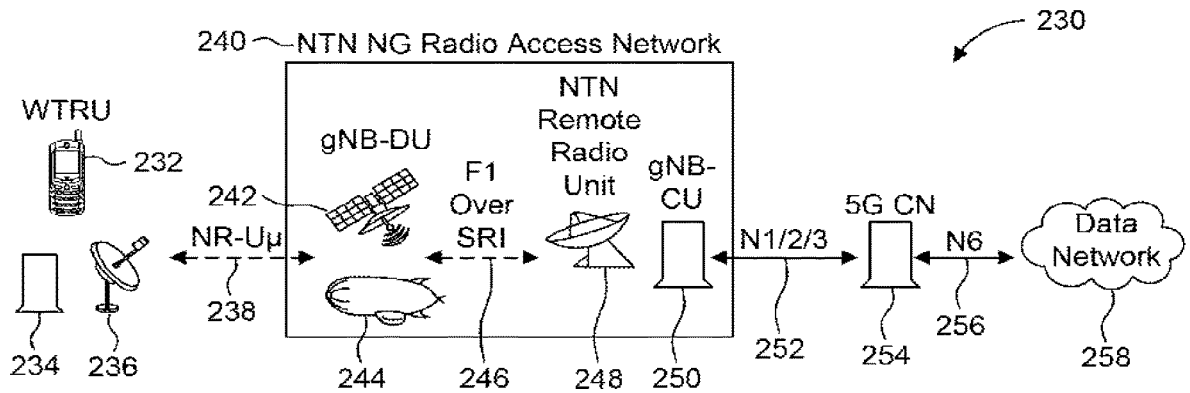
Figure 2:
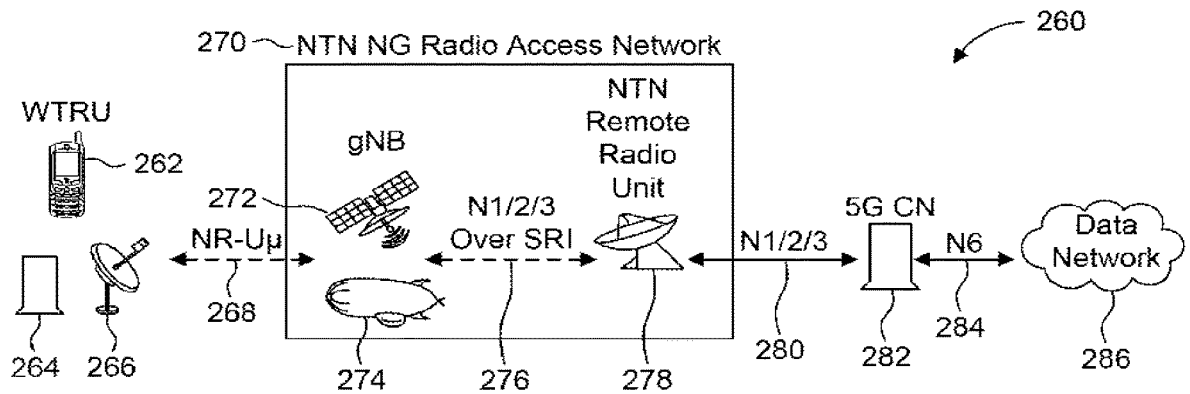

FIG. 2 is a network diagram which illustrates three configuration split architectures 200, 230, 260 which may be used for NTNs. The three configuration split architectures 200, 230, 260 are distinguished in accordance with a RAN functional split between a ground unit and a satellite. Split architecture 1 200 shows a next generation (NG) RAN architecture in an NTN with a bent pipe payload. In this example, a WTRU 202, network node 204 or satellite 206 may be in communication, via an NR-Uu interface 208, with an NTN NG radio access network 210. The NTN NG radio access network 210 may comprise a radio frequency bent pipe type satellite 212 and a blimp 214. An NR-Uu 216 may couple the radio frequency bent pipe type satellite 212 and blimp 214 to an NTN remote radio unit 218 and gNB 220. The gNB may, via an N1/2/3 interface 222 be coupled with the 5G CN. The 5G CN 224 may interface with a data network 228 via an N6 interface 226.

Split 2 230 shows an NG RAN architecture in an NTN with a gNB distributed unit (DU) process payload. In Split 2 230 and Split 3 260, a satellite radio interface (SRI) may be employed between a satellite unit and a ground based unit. In the split 2 230 example, a WTRU 232, network node 234 or satellite 236 may be in communication, via an NR-Uu interface 238, with an NTN NG radio access network 240. The NTN NG radio access network 240 may comprise a gNB DU 242 and a blimp 244. An F1 interface over SRI 246 may couple the gNB DU 252 and blimp 244 to an NTN remote radio unit 248 and a gNB centralized unit (CU) 250. The F1 interface may serve as a functional split interface, for example, one which provides a splits between a CU and a DU of an eNB. The gNB CU 250 may, via an N1/2/3 interface 252 be coupled with the 5G CN 254. The 5G CN 254 may interface with, for example, provide access to a data network 258 via an N6 interface 256.

Split 3 260 shows an NG RAN architecture in an NTN with a gNB processed payload. In this example, an NG RAN architecture 270 in an NTN includes a gNB configured to process a payload. In the split 3 260 example, a WTRU 262, network node 264 or satellite 266 may be in communication, via an NR-Uu interface 268, with an NTN NG radio access network 270. The NTN NG radio access network 270 may comprise a gNB 272 and a blimp 274. An N1/2/3 over SRI 276 may couple the gNB 272 and blimp 274 to an NTN remote radio unit 278. The NTN remote radio unit 278 may, via an N1/2/3 interface 280, be coupled with the 5G CN 282. The 5G CN 282 may interface with a data network 286 via an N6 interface 284.

A satellite may generate several beams, referred to as spot beams, to cover its service area bounded by its field of view, referred to as a footprint. Different implementations may be used based on a relationship between spot beams, synchronization signal blocks (SSBs) and physical layer cell identities (PCIs) of one or more satellites.

Figure 3:
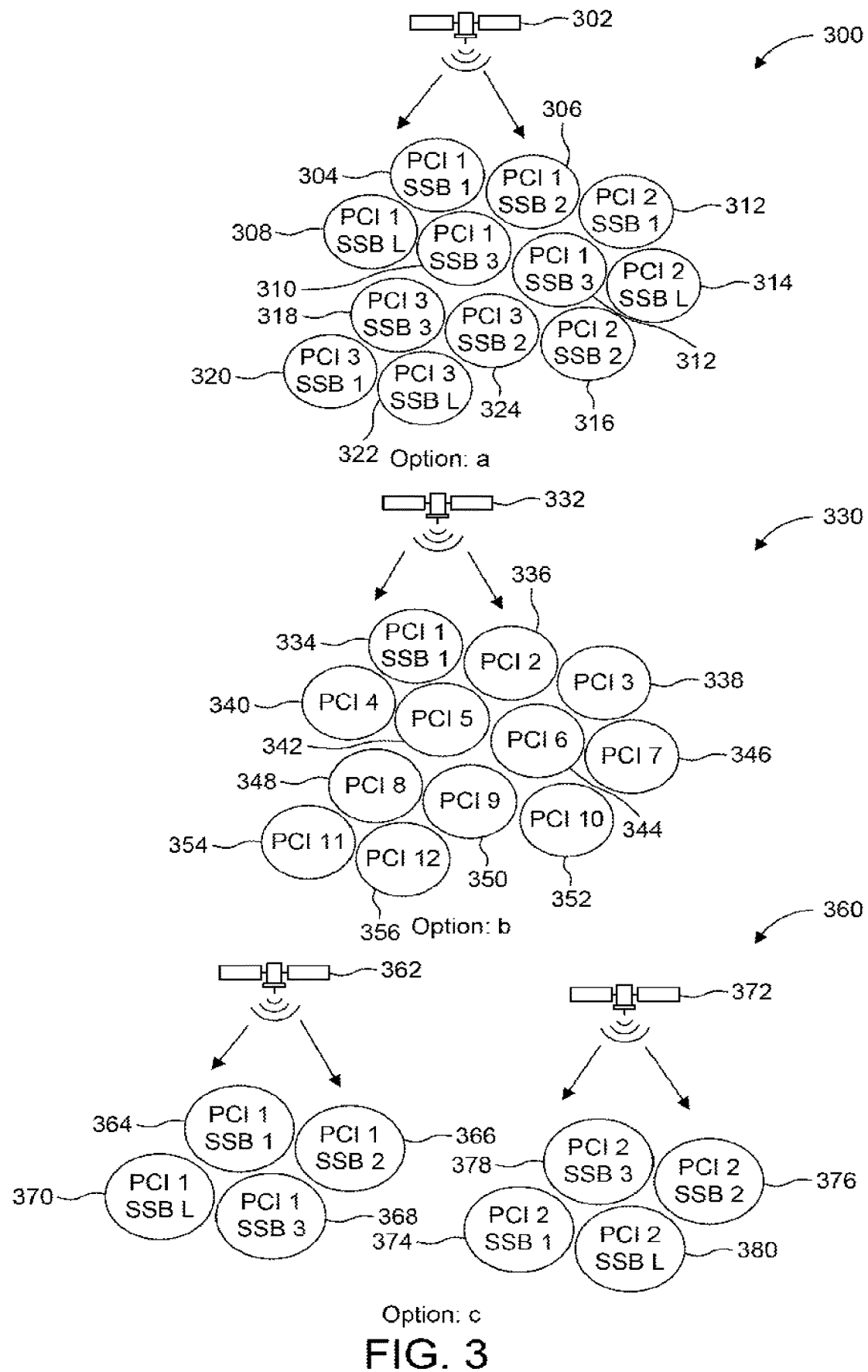
FIG. 3 is a diagram showing different example implementations for satellites with different spot beam, synchronization signal block (SSB) and physical layer cell identity (PCI) relationships.

FIG. 3 is a diagram showing different example implementations 300, 330, 360 for satellites with different spot beam, SSB and PCI relationships. In option a 300, a satellite 302 may transmit spot beams 304-324 corresponding to an SSB/PCI pair. In this example, spot beams include those denoted as: PCI 1, SSB 1 304; PCI 1, SSB 2 306; PCI 1, SSB L 308; PCI 1, SSB 3 310; PCI 1, SSB 3 312; PCI 2, SSB L 314; PCI 2, SSB 2 316; PCI 3, SSB 3 318; PCI 3, SSB 1 320; PCI 3, SSB L 322; and PCI 3, SSB 2 324.

In option b 330, a satellite may use multiple PCIs and each spot beam of the spot beam may correspond to a different PCI. Spot beams may be denoted as: PCI 1 SSB 1 334; PCI 2 336; PCI 3 338; PCI 4 340; PCI 5 342; PCI 6 344; PCI 7 346; PCI 8 348; PCI 9 350; PCI 10 352; PCI 11 354; PCI 12 356.

In option c 360, each one of two satellites 362, 372 may use a single PCI and each spot beam may correspond to a different SSB. For example, satellite 362 may use PCI 1. Thus, satellite 362 may have spot beams denoted as: PCI 1, SSB 1 364; PCI 1, SSB 2 366; PCI 1, SSB 3 368; PCI 1, SSB L 370. Another satellite 372 may use PCI 2, which may be different from PCI 1. This satellite 372 may have spot beams denoted as: PCI 2, SSB 1 374; PCI 2, SSB 2 376; PCI 2, SSB 3 378; PCI 2, SSB L 380.

Figure 4:
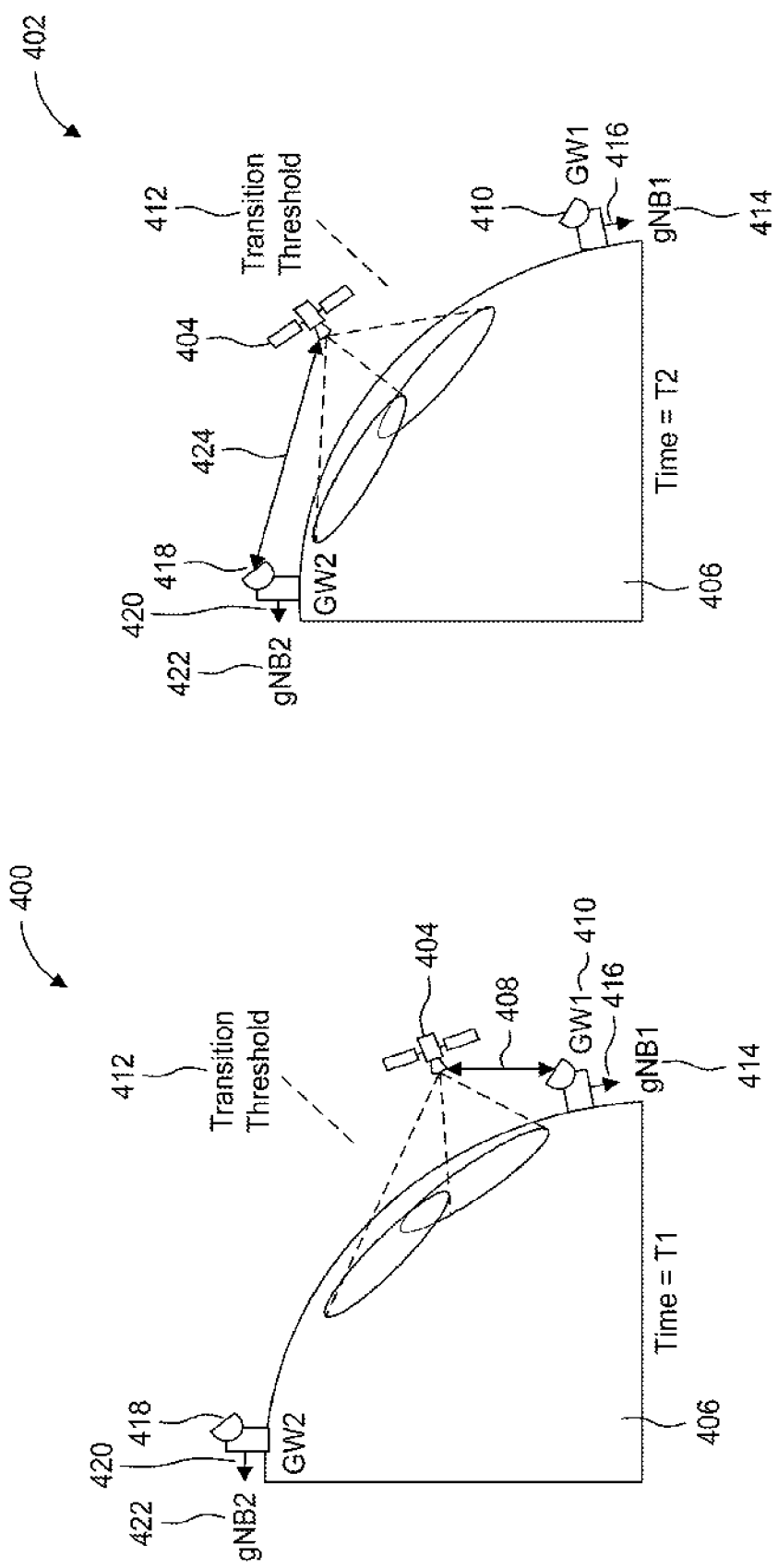
FIG. 4 is a diagram showing an example of feeder link switching for a non-geostationary (non-GEO) satellite.

FIG. 4 is a diagram showing an example of feeder link switching for a non-GEO satellite 404. In non-GEO constellations, feeder link switching may provide service continuity when a gateway (GW) is no longer the best candidate to serve a given satellite due to satellite movement with respect to Earth. A change of GW may occur without knowledge from the WTRU if the satellite has a regenerative configuration, such as where the gNB is located in the satellite. Otherwise, for satellites with a transparent configuration, such as where the gNB is located in the GW, all WTRUs currently served by the satellite may have to re-establish a connection to the target GW given the implied change of the gNB.

In the example shown in FIG. 4, at a first time instant, T1 400, a satellite 404 may be located at a first position with respect to Earth 406. In the first position, at time T1 400, the satellite 404 may be in communication range, via a wireless link 408, with a gateway, for example, GW1 410. This may be due to the satellite being within a transition threshold 412. GW1 410 may be in communication with a gNB 414 via another wired or wireless link 416. Alternatively, GW1 416 may be collocated with gNB 1 414. The satellite 404 may be out of range of GW2 418 and thus link 420 may not convey satellite 404 control or data to or from gNB2 422.

At another time instant, T2 402, the satellite 404 may move to a second position with respect to Earth 406. In the second position, the satellite may not be in communication range, via a wireless link, with GW1 414. This may be due to the transition threshold 412 being exceeded. When the transition threshold 412 is exceeded, the satellite 404 may establish communication with GW2 via wireless link 424. GW2 may be in communication with gNB2 422 via link 420.

Some entities, including eNBs and gNBs, that perform one or more radio access functions may not be stationary. Examples of such entities may include non-terrestrial deployments, such as satellites, high altitude pseudo satellites (HAPS), airborne platforms, and aerial base stations, such as drones or other unmanned aerial vehicles. By way of example, low and medium Earth orbit satellites may move rapidly with respect a given WTRU location. As an example, on a two-hour orbit, a low Earth satellite may be in view of a stationary WTRU from horizon to horizon for about 20 minutes. Such rapid movement may create issues for mobility procedures for both moving and stationary WTRUs. Moving WTRUs may include WTRUs which are not land based, for example, watercraft WTRUs including boats, ships or other vessels. Embodiments described herein may address such issues.

Although non-terrestrial deployments are provided herein as specific examples, the embodiments described herein are in no way limited to such scenarios and may also be applicable for terrestrial deployments, such as non-stationary relay nodes, and other wireless technologies, such as WiFi and LTE. The term satellite herein may be understood as generically referring any non-stationary entity performing one or more RAN function.

When a satellite moves, the geographic location over which the satellite provides service may change. Accordingly, a constellation of satellites may be deployed to provide continuous coverage. For example, when a satellite leaves a coverage area, a different satellite within the constellation may take the responsibility to provide continued coverage to a location that a previous satellite just left. Since a stationary WTRU may typically only be in a spot beam for a few minutes for non-geostationary (non-GEO) satellites, a scenario may occur where WTRUs in a coverage area need to frequently switch over, or be handed over, to different satellites (referred to herein as a "satellite switch"). Satellites may overlap in coverage in some instances or during some time periods.

For terrestrial mobility in Release 15, when a GW change occurs, a satellite may suddenly need to reconfigure itself to serve the new GW, including transmission of a new SSB. The WTRU may not be aware that this change may take place since the measurements of the target cell may not be available to the WTRU unless the satellite begins broadcasting the SSB associated with the target GW in advance. The sudden change or reconfiguration may result in the WTRU losing its connection, thus triggering a re-establishment to the reconfigured satellite.

From a systems perspective, re-establishing a connection with the g NB every time a WTRU changes GWs for transparent non-GEO satellite(s) may be costly in terms of service continuity. More specifically, the cumulative delay incurred when re-establishing a connection may result in significant service interruption considering that two GWs may be geographically located very far apart and propagation delay may be orders of magnitude higher than for terrestrial networks.

In embodiments, physical layer transmission aspects, such as PCI, may be satellite-specific. In other words, the cell or plurality of cells may move along with the satellite. In such embodiments, a change in satellite over a coverage area may result in a change in PCI. From a WTRU perspective, a change in satellite may be seen as handover event. Such embodiments maybe referred to herein as having non-transparent satellite mobility.

Figure 5:
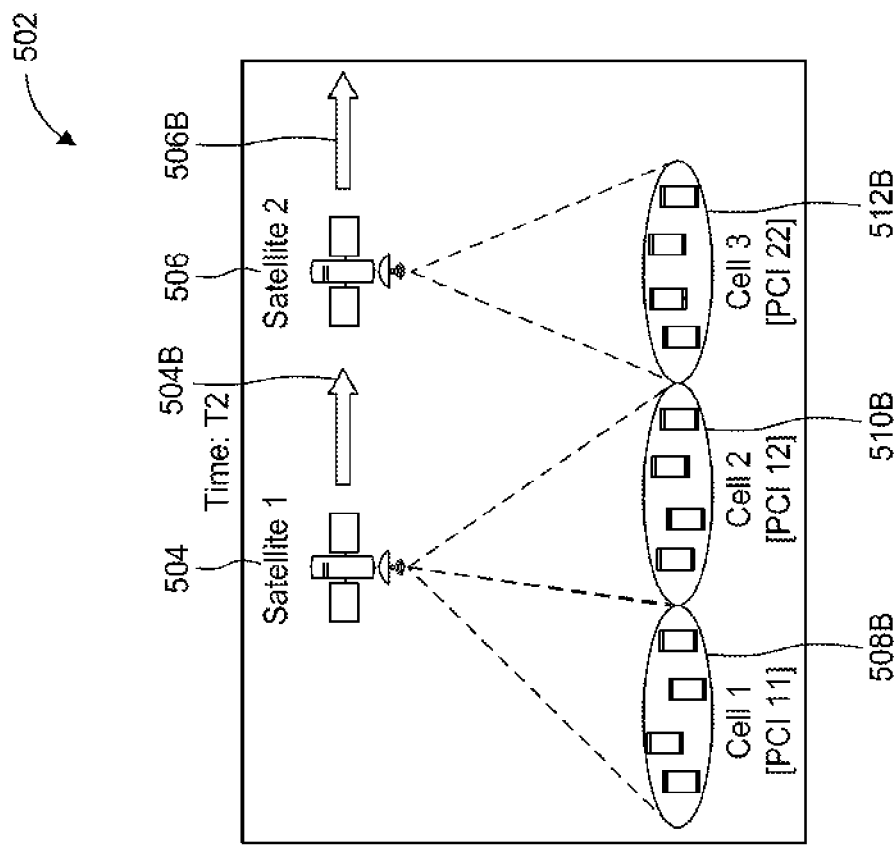
FIG. 5 is a network diagram of an example of non-transparent satellite mobility.
Figure 5:
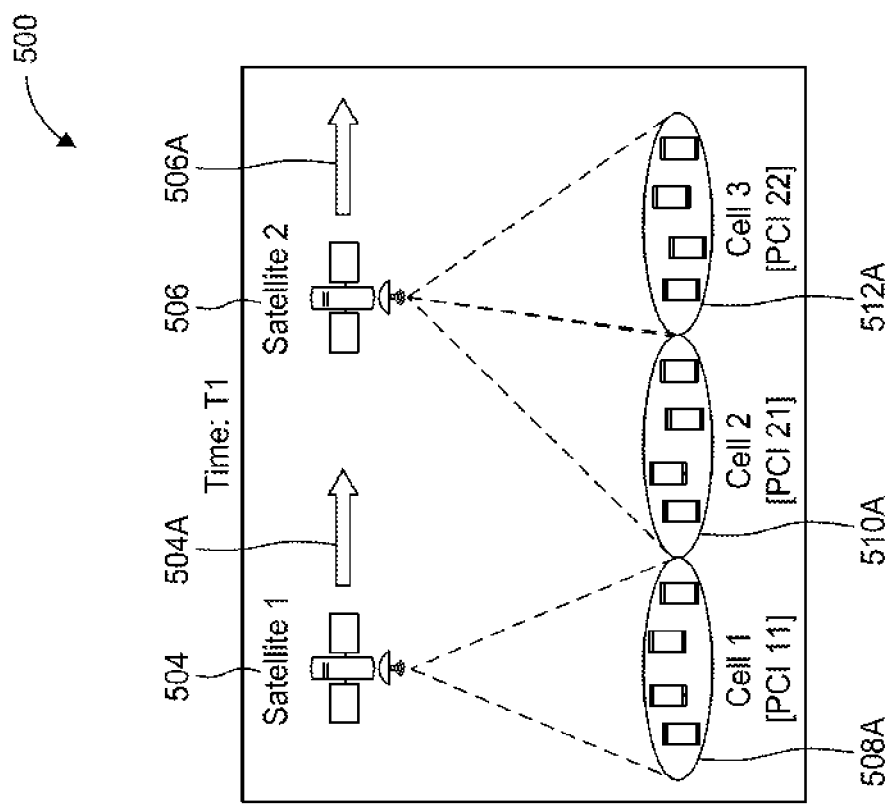

FIG. 5 is a network diagram of an example of non-transparent satellite mobility. In the example illustrated in FIG. 5, at time T1 500, satellite 2 506 illuminates two cells, cell 2 510A and cell 3 512A, with its own PCI 21 and PCI 22 respectively. Satellite 1 504 illuminates cell 1 508A with PCI 11. At T1, satellite 1 504 and satellite 2 506 are moving 504A, 506A. At time T2 502, satellite 2 506 moves away 506B from cell 2 510B. Satellite 1 504 may also move 504B to take its place and thus may provide coverage to cell 2 510B. In this example, satellite 2 506 may use PCI 12 to provide coverage to cell 2 510B. The WTRUs in cell 2 510B may be configured to treat this as a satellite mobility event at time T2 502. Satellite 1 504 may still illuminate cell 1 508B with PCI 11. Satellite 2 506 may only illuminate cell 2 512B with PCI 22. Such example may be extended to cases where a satellite uses multiple spot beams to cover a cell, or each satellite may cover only one cell at a given time.

In other embodiments, the physical layer transmission aspects, such as PCI, may be specific to the coverage area. In other words, the satellite may adapt its transmissions according to the coverage area. In such embodiments, a change in satellite over a coverage area may not result in a change in PCI. From a WTRU perspective, a change in satellite may be handled as an intra-cell handover. Such embodiments may be referred to cell transparent satellite mobility.

Figure 6:
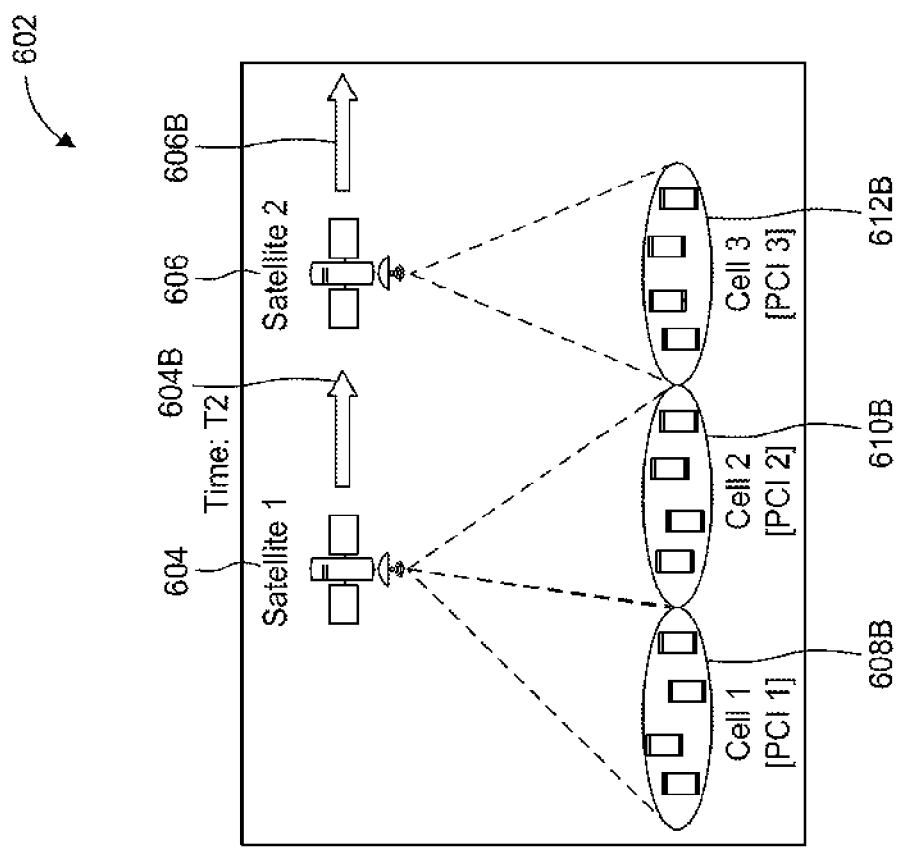
FIG. 6 is a network diagram of an example of cell transparent satellite mobility.
Figure 6:
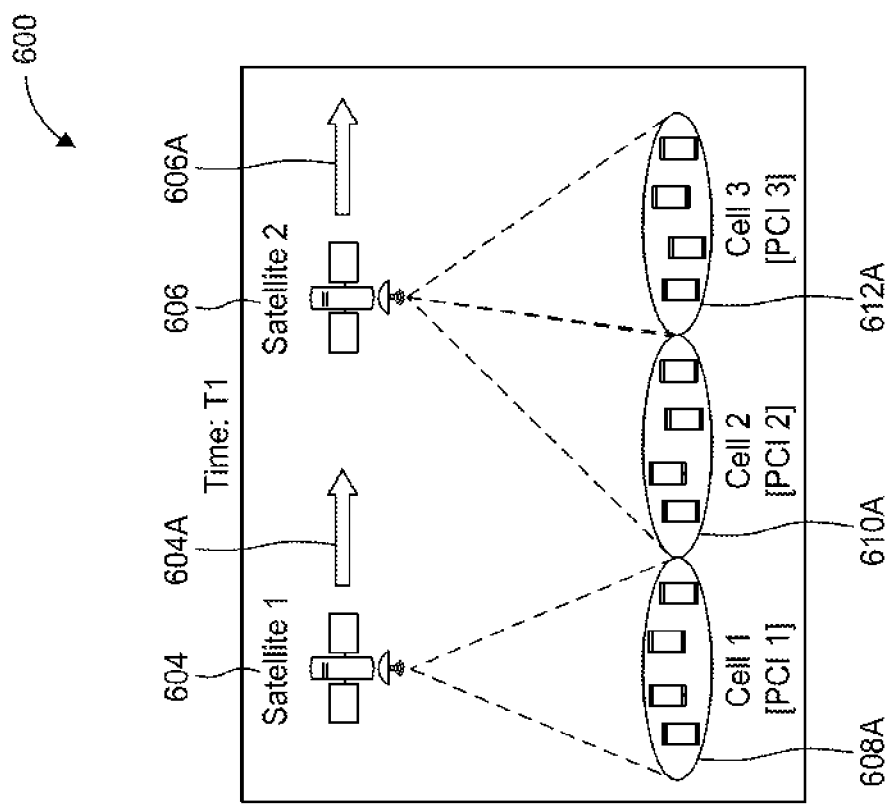

FIG. 6 is a network diagram of an example of cell transparent satellite mobility over time T1 600 to T2 602. In the example illustrated in FIG. 6, at time T1 600, satellite 2 606 illuminates 2 cells, cell 2 610A and cell 3 612A, with a PCI 2 and PC 13, respectively, whereas satellite 1 604 illuminates cell1 608A with PCI 1. At time T1 600, satellite 1 604 and satellite 2 are moving 604A, 606A. At time T2, satellite 2 606 moves away 606B from cell 2 610B, and satellite 1 604 may move 604B to take its place and provide coverage to cell 2 610B. In this example, satellite 2 606 may use PCI 2 to provide coverage to cell 2 610B. The WTRUs in cell 2 610B may be configured to treat this as a satellite mobility event, for example, a triggered intra-cell handover event, at time T2 602. Cell 1 608B may remain illuminated by satellite 1 604 at time T2 602. Satellite 2 may only illuminate cell 3 612B at time T2 602. In some embodiments, the WTRU may be configured to assume system frame number (SFN) continuity after a satellite mobility event. This example may be extended to cases where a satellite uses multiple spot beams to cover a cell, or each satellite may cover only one cell at a given time.

In non-GEO NTN deployments, a path of the satellite may be known in advance and the timing between satellites may be precisely coordinated. This information may be used to enable low overhead mobility procedures. In embodiments, the WTRU may be configured to perform an action corresponding to a mobility procedure at a time instance, for example, at a frame, subframe or slot boundary. The WTRU may be configured with a time instance after which the WTRU may not assume that the current serving gNB (e.g., satellite) is available for communication. The time based trigger may also be beneficial to indicate the time after which the WTRU may assume that the incoming satellite has received the WTRU context and is ready to serve the WTRU. For example, a serving satellite may ensure that the necessary WTRU context is available at the target satellite before the time instance associated with satellite mobility.

Due to excessive propagation delay associated with NTN deployments, measurement reporting may be delayed, and/or handover commands may be lost, resulting in handover failures. In embodiments, a WTRU may receive a radio resource control (RRC) reconfiguration with a trigger condition associated with a future time instance or offset thereof. The time instance may correspond the time when a change of satellite takes place. The time instance may be indicated using one or more of the methods described below. The WTRU may apply a stored reconfiguration at a time instance configured in the serving cell.

A WTRU may be configured to send a measurement report at a time instance configured in or by the serving cell. In embodiments, measurement information may be broadcast or unicast by a satellite or base station. In embodiments, the WTRU may be configured with a measurement configuration with a report configuration associated with an offset to a time instance. The time instance may be indicated using one or more embodiments described below. For example, the time instance may correspond to the time when the satellite leaves the coverage area, and the offset may be configured based on propagation delay such that the mobility procedure may be carried out before a new satellite arrives. In embodiments, the offset may be broadcast in the system information. In another embodiment, the offset may be configured specific to the WTRU. This may be beneficial to trigger a mobility event to the WTRU before the serving satellite moves out of the coverage area, in one embodiment, when a better terrestrial gNB is nearby. In some embodiments, the WTRU may be configured to perform neighbor measurements without DRX cycle restrictions and/or relaxations during a satellite switch event.

Due to transparent satellite mobility, in some embodiments, the WTRU may trigger a procedure, for example, a connection request procedure, but before the request is processed or a response is received, the serving satellite may move away and a new satellite may takes over the request. This may result in unnecessary delays, control plane latency, and service interruption. To avoid this, the WTRU may be prohibited to attempt a new RRC procedure during an impending satellite mobility. For example, a WTRU may be configured to suspend one or more procedures on or after time instance configured in the serving cell. In embodiments, the WTRU may be configured to suspend signaling radio bearers (SRBs) starting from an offset to the time instance associated with satellite change. The time instance may be indicated, for example, using any of the methods described below. The WTRU may further be configured to resume SRBs upon receiving transmissions from the new satellite. In embodiments, the WTRU may be configured to determine if one or more protocol layers need to be reestablished during a satellite mobility event, in one embodiment, from a stored reconfiguration. The WTRU may suspend signaling at those protocol layers if there is an upcoming satellite mobility event. The WTRU may resume signaling at those protocol layers upon successful reestablishment of the protocol layers.

In embodiments, a WTRU may be configured to delay, suppress or refrain from performing at least certain UL transmissions, such as those associated with MAC procedures, when a satellite switch event is upcoming. For example, the WTRU may stop processing UL transmissions related to uplink resources for new transmissions, for example, data transmissions, control transmissions, HARQ transmissions or the like. Additionally or alternatively, the WTRU may stop the processing of grants and/or performing an initial transmission for a HARQ process. Additionally or alternatively, the WTRU may continue to perform processing data associated with SRBs, but not for DRBs. The WTRU may be configured to delay, cancel or suspend a random-access procedure, including a preamble transmission and/or a retransmission triggered at time T, if a satellite switch event is scheduled at time T+x, wherein the value of x may be preconfigured. The value of x may be a function of time taken to complete a random access procedure, for example, a 2-step random access procedure or 4-step random access procedure. Additionally or alternatively, the value of x may be a function of time taken to complete another procedure. Additionally or alternatively, the value of x may be a function of the round trip time (RTT) for transmission between the WTRU and the network. The RTT may be a multiple of the estimated and/or observed RTT. Additionally or alternatively, it may correspond to the observed HARQ RTT, for example, the time from the reception of the first grant for a new transmission until the time the WTRU determines that the HARQ process has successfully completed. In another example, the WTRU may be configured to suspend scheduling request transmission or retransmission at time T, if a satellite switch event is scheduled at time T+x. Similarly, other MAC control transmissions may be suspended when a satellite switch event is upcoming. Whether or not the WTRU performs any of the above functions may be a configuration aspect of the WTRU.

A WTRU may be configured to receive an indication of a time instance associated with satellite mobility. Such time instance may be signaled using one or more mechanisms, including, for example, via signaling parameters including: a time indication using coordinated universal time (UTC), a time indication using a counter or a pre-configured hyper frame number (HFN) value.

Regarding a time indication using coordinated universal time (UTC), a WTRU may receive the time instance indication as a value of UTC. The UTC value may correspond to a number of seconds elapsed since a fixed point in the past. For example, the WTRU may receive a current UTC broadcast in a system information message. For example, the WTRU may receive the UTC associated with the satellite mobility event, for example, when the satellite mobility may be triggered, in a broadcast message. The WTRU may be configured to perform a reconfiguration when the current UTC becomes equal to the UTC associated with the satellite mobility event. In some embodiments, the WTRU may be configured with a UTC associated with a satellite mobility event in dedicated RRC signaling which may be signaling as part of a conditional reconfiguration.

Regarding time indication using a counter, a WTRU may be configured to implicitly receive the indication of the time instance via a status of a counter. For example, the WTRU may receive a counter value that indicates a number of time units left until the satellite mobility event. The time units may be expressed in terms of multiples of SFN, modification period, subframe, slot and/or ms from the boundary of a message carrying the counter value. Time units may be expressed in terms of an offset, for example, a number of subframes from 0. A counter may be carried in a broadcast message, for example, a master information block (MIB) or a system information block (SIB) message. The WTRU may be configured to perform a reconfiguration associated with satellite mobility when the count value reaches zero.

Regarding the use of a preconfigured HFN value, the WTRU may be configured to determine the time indication based on the HFN value configured for the satellite mobility event. For example, the preconfigured HFN value may be broadcast in system information, for example, in a MIB or SIB. The WTRU may be configured to perform a reconfiguration associated with satellite mobility when the system HFN reaches the value associated with the satellite mobility event.

In NTN deployments, the flight path of satellites may be deterministic. Thus, the coverage provided by the satellite on Earth may also be deterministic. The WTRU may be configured with an association between geographical location and one or more satellites that may provide service at that location. A WTRU, upon moving into an area serviced by a satellite different than the current satellite, may be configured to perform one or more actions associated with mobility. In embodiments described below, the location of a WTRU may be expressed by one or combination of global navigation satellite system (GNSS)/global positioning system (GPS) coordinates, a function of the spot beam serving the WTRU, and visibility of a number of satellites. Satellites may provide GPS information in broadcast signaling or out of band, for example, out of cellular band signaling.

In embodiments, a WTRU may be configured to apply a stored reconfiguration as a function of its location. The location may be expressed in terms of GNSS/GPS location and/or spot beam currently serving the WTRU. For example, the location of geosynchronous satellites may be fixed relative to a location on Earth. The WTRU may be configured to apply a stored reconfiguration when it enters the coverage area associated with a different satellite. Relying on location information, instead of a cell measurement based approach, may be beneficial if the time taken for convergence of cell measurements is slower than obtaining the location information. Also, in NTN deployments, since the location and/or the coverage of different satellites may be known well in advance, unnecessary measurement overhead may be reduced.

Since a satellite coverage area may be quite large, it may become cumbersome to configure terrestrial neighbors for measurements. In embodiments, a WTRU may be configured to apply a measurement configuration as a function of its location within the satellite footprint. For example, the WTRU may be configured with a plurality of measurement object lists. The WTRU may select and apply a measurement object list for measurements as a function of WTRU location. The WTRU location may be expressed as a function of GNSS/GPS coordinates or based on the spot beam currently serving the WTRU.

In an embodiment, the WTRU may be configured to apply a RRC reconfiguration at a time greater than or equal to a preconfigured time instance. In another embodiment, the WTRU may be configured to apply a RRC reconfiguration based on its location with respect to satellite position, for example, based on ephemeris data. The WTRU may rely on a neural network to determine apply the RRC reconfiguration. The WTRU may determine its location based on one or more of GNSS/GPS data, positioning methods and/or RAN based positioning methods. In another embodiment, the WTRU may apply an RRC reconfiguration when a condition based on a combination of both time and location is satisfied, in one embodiment, along with a cell quality metric above a threshold. In an embodiment, the RRC reconfiguration may initiate UL timing alignment procedure. In another embodiment, the RRC reconfiguration may reestablish RLC and/or PDCP. Additionally or alternatively, the RRC reconfiguration may reset the MAC layer. Additionally or alternatively, the RRC reconfiguration may result in a security context update, for example, deriving and using new access stratum security keys.

Figure 7:
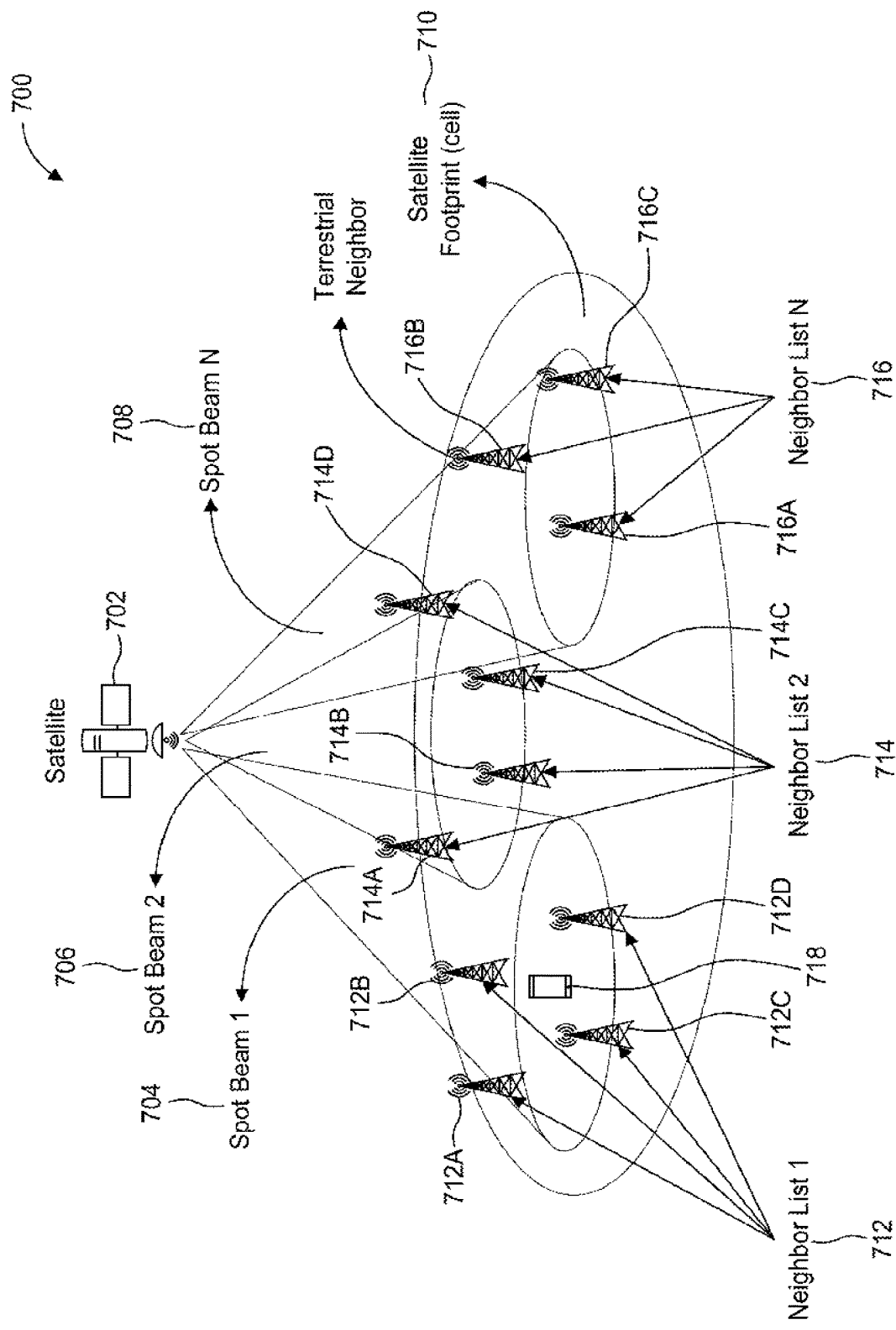
FIG. 7 is a network diagram showing location based measurement object selection.

FIG. 7 is a network diagram 700 showing location based measurement object selection. In the example illustrated in FIG. 7, the WTRU 718 may be configured with N measurement object lists and may be configured to determine one measurement object list from the plurality of the lists based on WTRU location which may be associated with a spot beam 704-708 illuminated by a satellite 702, in embodiments. For example, the WTRU 718 may select and apply a neighbor list 1 712 for measurements when served by spot beam 1 704. Neighbor list 1 712 may indicate gNBs 712A-712D. The WTRU 718 may further be implicitly configured to reconfigure the measurement object list upon moving to a different spot beam. For example, when the WTRU 718 moves to a location illuminated by spot beam 2 706, the WTRU may apply neighbor list 2 714. Neighbor list 2 714 may indicate gNBs 714A-714D. When the WTRU 718 moves to spot beam N 708, the WTRU may apply neighbor list N 716. Neighbor list N 716 may indicate gNBs 716A-716C.

In other embodiments, the WTRU may be configured to trigger a start of a neighbor measurement as a function of WTRU location. For example, the WTRU may be configured to start taking one or more neighbor measurements when the WTRU enters a spot beam at the edges of a satellite footprint. The WTRU may be configured to take measurements based on a next spot beam entered from a previous spot beam. In this way, directional movement of the WTRU may trigger measurement taking.

In embodiments, a WTRU may be configured to monitor a downlink (DL) signal addressed to more than one WTRU. The DL signal may indicate a mobility event. Such a multi-cast DL signal may avoid the need to transmit WTRU specific signaling (e.g., an RRC reconfiguration) to a large number of WTRUs via the satellite link with a large propagation delay. In embodiments, the WTRU may always be configured to monitor for such DL multi-cast signal. In other embodiments, the WTRU may be configured to monitor for a multi-cast DL signal only during a time interval when satellite mobility is planned.

In embodiments, the WTRU may be configured to monitor for a physical downlink control channel (PDCCH) order addressed to a pre-defined radio network identifier (RNTI). In one example, the RNTI may be associated with a group of WTRUs which may be located within a spot beam. In another example, the RNTI may be cell specific applicable to all WTRUs in the cell. For example, the RNTI may be predefined for a mobility event, for example, using one of the values from 0xFFF0-0xFFFD. The WTRU may determine that a satellite mobility event has occurred when the PDCCH order is received with the predefined RNTI. In some embodiments, the WTRU may be configured to apply a stored reconfiguration when a PDCCH order associated with a mobility event is received. The RNTI may be associated with a specific configuration. For example, the WTRU may use the RNTI value to determine what configuration to apply for the mobility event. The WTRU may be configured with a plurality of RNTIs for a given cell ID and/or satellite.

In embodiments, the WTRU may determine an upcoming satellite mobility event based on receiving an indication in the paging message. In some embodiments, such paging message may indicate the type of satellite mobility, for example, whether the satellite mobility is a non-transparent satellite mobility type or a cell transparent satellite mobility type. In other embodiments, the WTRU may be configured to determine an upcoming satellite mobility event based on an indication provided in in short DCI messages addressed to a P-RNTI. For example, one or more bits may be reserved in the short messages on the PDCCH to indicate the occurrence and type of satellite mobility events.

In embodiments, the WTRU may be configured to trigger a mobility procedure, for example, a reconfiguration with synchronization procedure, when a specific system information message is received. For example, the WTRU may be configured to trigger a mobility procedure when an indication of presence or transmission of a special system information or update thereof is received. Such system information may be specific to a group mobility event, may include parameters to apply upon a feeder link switch event, may include a transient configuration, may include parameters to apply upon handover to the target cell and/or may include minimal configuration needed to synchronize with the target cell. The WTRU may be further configured with a dedicated RRC configuration upon successful synchronization with the target cell. The WTRU may be configured to acquire such system information as soon as it is transmitted or updated. The WTRU may be configured to apply the system information at a time configured by the system information. For example, such time may correspond to the timing of the satellite switch and/or feeder link switch. In some embodiments, such system information may be associated with an RNTI different than the SI-RNTI, for example, a reserved RNTI.

In embodiments, the WTRU may be configured to perform different actions based on whether or not the physical cell changes due to satellite mobility. For example, the WTRU may be configured to perform a first set of actions when a satellite mobility occurs with a change in physical cell ID (e.g., non-transparent satellite mobility). For example, a first set of actions may correspond to legacy handover or RRC reconfiguration with synchronization. The WTRU may additionally, or alternatively, be configured to perform a second set of actions when the physical cell ID is not changed due to satellite mobility including cell transparent satellite mobility. For example, a second set of actions may correspond to a WTRU maintaining the master cell group configuration, RNTI, radio bearer configuration, measurement configuration, or received SIBs. The second set of actions may further include WTRU synchronization with the physical cell ID, such as after the time instance to trigger mobility event is reached, after the location to trigger the mobility event is reached and/or after a DL signal indicating the WTRU received a mobility event.

In embodiments, a WTRU may be configured to request an updated timing advance after a transparent satellite mobility event. This may be required since the timing and/or channel conditions of different satellite transmissions may differ due to, for example, different orbital characteristics, such as altitude, elevation, or angle. For example, the WTRU may be configured to trigger preamble transmissions upon detecting a satellite mobility event. In order to avoid collisions due to a number of WTRUs attempting preamble transmissions at the same time, DL initiated preamble transmissions may be configured. For example, the WTRU may be configured to monitor for a possible PDCCH order addressed to its RNTI to perform preamble transmissions. The order may explicitly indicate to the WTRU that a mobility event took place. If a PDCCH order is not received for a preconfigured time period, the WTRU may trigger a contention based preamble transmission or a dedicated preamble transmission if the order provides one.

In some cases, such as when the satellite is changed and a data/WTRU context may need to be transferred between satellites, the WTRU may be required to perform additional actions, including PDCP data recovery, PDCP re-establishment, RLC re-establishment, security re-establishment, triggering of a new BSR, and MAC reset. The PDCCH order may explicitly indicate to the WTRU that these actions need to take place, or the WTRU may determine this based on its location. Alternatively, the WTRU may wait for RA msg2 response to trigger those actions and/or explicitly be instructed to perform these actions after the msg2 response.

In embodiments, the RRC reconfiguration, as a function of time instance and/or location, may be modeled as a conditional reconfiguration. Trigger conditions may be associated with time instance and/or location, thus triggering the reconfiguration. Alternatively, the WTRU may be configured to apply a reconfiguration based on broadcast indication at a preconfigured time instance, wherein the time instance may correspond to the change in termination point of at least one RAN function, such as a satellite switch event. Similarly, the WTRU may be configured to apply a broadcast configuration at a preconfigured location, wherein the location may correspond to change in termination point of at least one RAN function.

The WTRU may be preconfigured with a layer 2 (L2) behavior based on the time and/or location triggers. For example, the WTRU may determine the extent of L2 and/or layer 3 (L3) context persistence based on the broadcast indication. Additionally or alternatively, the WTRU may determine the extent of L2/L3 context persistence based on the broadcast indication. In bent pipe architectures, the WTRU may be configured to perform layer (L) resynchronization, while maintaining the radio bearers. In regenerative architectures, the WTRU may be indicated via a broadcast configuration of whether the MAC layer needs to be reset or if RLC and/or PDCP layer need to reestablished.

Figure 8:
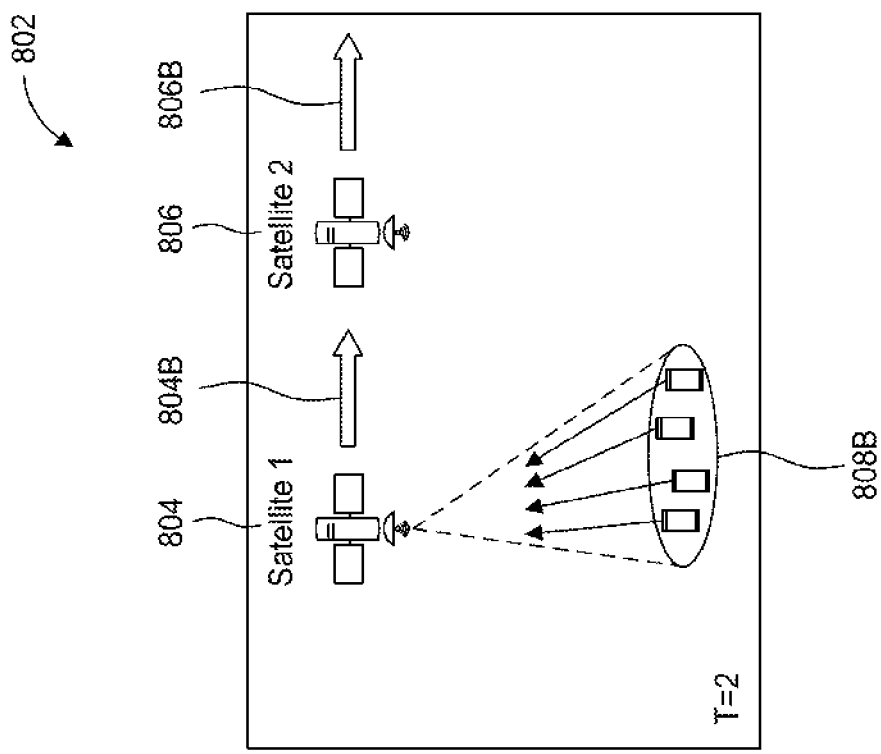
FIG. 8 is a network diagram showing transient configuration associated with a mobility event.
Figure 8:
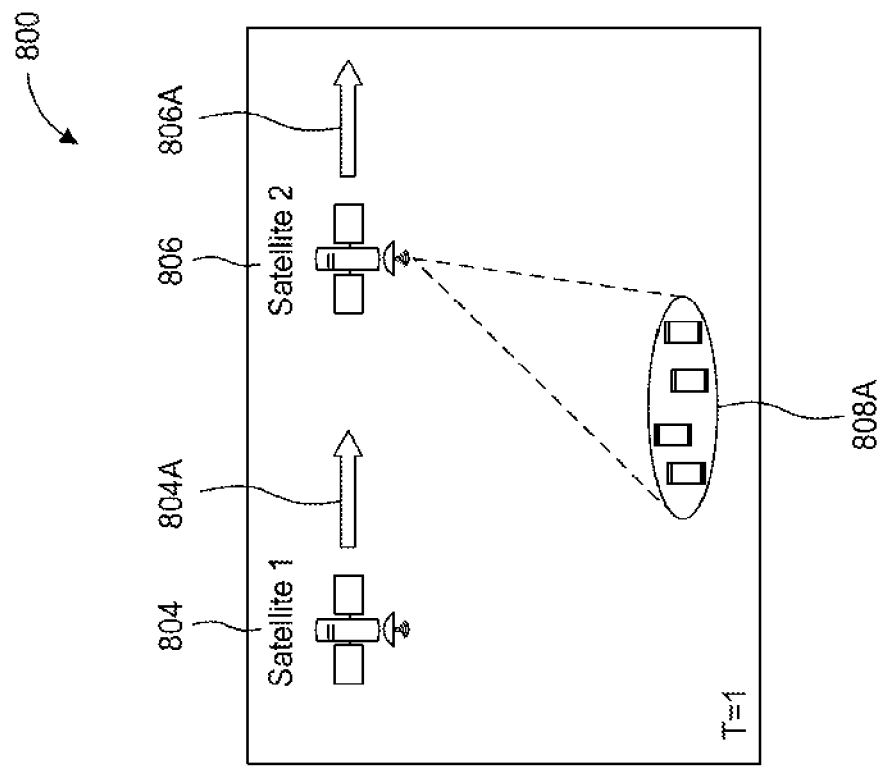

FIG. 8 is a network diagram showing an application of a transient configuration associated with a mobility event. In the example illustrated in FIG. 8, the WTRU may be configured to apply a configuration that lasts for a specified duration, i.e., a transient configuration, wherein the configuration does one or more of the following: provides more opportunities for DL synchronization measurements; provides more opportunities for UL synchronization, for example, provides for a denser Random Access Channel (RACH) configuration via RACH occasions; provides a mechanism for the WTRU to determine a start of a DL signal availability for measurements; and provides a mechanism for the WTRU to determine a start of an UL resource availability for a preamble transmission. Such transient configurations are feasible for at least the reason that in the time period immediately after a satellite mobility event, the UL and/or DL resources of the cell are not occupied due to a lack of data transmissions.

The embodiments illustrated by FIG. 8 are shown over two time instants T1 800 and T2 802. At time instant T1, satellite 1 804 is moving 804A along with satellite 2 806 in a same movement direction 806A. Satellite 2 services WTRUs of a spot beam 808A. At time T2, satellite 1 804 and satellite 2 806 may move 804B, 806B such that spot beam 808B becomes served by satellite 1 804. With a change in spot beam, WTRUs being served may be configured to perform an action, for example, to perform RACH transmission. If each WTRU performs RACH at a same time occasion, a resource conflict may occur. Thus, a WTRU may instead apply a transient configuration, for example, which assists in RACH or provides for an improved RACH mechanism.

In embodiments, a WTRU may be configured with a first set of resources and a second set of resources for the purpose of synchronization, measurement taking, sounding and random access, where the first and second set of resources may be valid only during different pre-scheduled periods of time. This approach has the benefit of allowing for the provision of additional or more frequency resources only during one or more periods when it is known that such resources are needed. For example, the one or more periods may occur at or around the time a mobility event due to a switch of satellite occurring. The one or more periods of time may be predictable in advance based on satellite ephemeris and WTRU approximate location.

In embodiments, the first set of resources and the second set of resources may be applied to include at least one of: measurement configuration or elements thereof, such as SSB and SSB measurement timing configuration elements, CSI-RS and measurement objects for NR; one or more RACH configurations, including configured RACH resources; radio link monitoring configuration; SRS; PDCCH one or more configurations; and one or more DRX configuration.

In embodiments, the WTRU may determine whether to apply the first set of resources or the second set of resources. For example, the WTRU may be provided with a set of start times end times or start times and durations for the applicability of a configuration. The start and/or end times may be expressed in absolute time units or in terms of a combination of HFN and SFN. The set of start and/or end times may be obtained from the application of a formula. The duration may be expressed in terms of a number of subframes. Alternatively, the WTRU may use reception of downlink control signaling, such as a PDCCH received from a common search space using a specific RNT1. The RNT1 value or by a field of DCI may indicate the first set of resources of the second set of resources.

In embodiments, the WTRU may be configured with one or more special RACH occasions in addition to regular RACH occasions. Alternatively, the WTRU may be configured with two sets of special RACH occasions or with a special or dedicated RACH configuration that may be applied instead of the special RACH occasions. The special RACH configuration may enable increased opportunities for preamble transmission and may provide increased RACH capacity to address the need for a potentially large number of WTRUs executing mobility events. This approach may be beneficial as different time and frequency domain RACH resources may provide better isolation and may not suffer from high cross correlations issues associated with usage of different root sequences to increase RACH capacity. This embodiment may be employed when a satellite and/or WTRU has knowledge of satellite movement and may recognize that handover is imminent. The resources dedicated to the RACH configuration may be resources which would have otherwise been used for other data and control resources.

In embodiments, the WTRU may be configured with dedicated RACH resources with regular RACH occasions and special RACH occasions. For example, the WTRU may receive a RACH-config dedicated and a RACH-config dedicated special configuration. In another example, the WTRU may receive a RACH-config dedicated configuration, which may include a RACH-ConfigGeneric and a RACH-Config-GenericSpecial configuration. The WTRU may be configured to apply the special configurations either in addition to or alternative to regular RACH configurations. In another example, the special RACH configuration may be part of a common RACH configuration.

In embodiments, the WTRU may be configured to apply special RACH configurations during execution of a mobility event. The mobility event may be triggered based on network signaling or based on location and/or time based triggered. In a further embodiment, the WTRU may be configured to apply the special RACH configuration for specific target cells, for example, towards an incoming satellite or aircraft and may exclude a RACH configuration towards certain other target cells, for example, towards a terrestrial cell. The WTRU may be configured to release the special RACH configuration and/or apply regular RACH configuration based on preconfigured triggers. Such triggers may include, but are not limited to a successful completion of RACH procedure; expiration of a timer (e.g., T304, or a specific timer associated with a special RACH occasion configuration), when the current SFN exceeds an absolute SGN, at an absolute point in time (e.g., UTC) or based on explicit signaling from the network.

In embodiments, the special RACH occasions may be realized by using one or a combination of the following: increasing a number of RACH occasions, from a baseline number of RACH occasions, multiplexed in a frequency domain, for example, by configuring a higher value for msg1-FDM or the like; increasing the number of RACH occasions multiplexed in time domain, for example, by configuring the value of prach-Configuration Index such that it leads to increased RACH occasions as compared to regulation or baseline configurations, including but not limited to increasing the number of radio frames that contain RACH occasions (a suitable value of x, y in the equation SFN mode x=y, e.g., x=1 and y=0 or similar); increasing the number of subframes that contain RACH occasions; increasing the number of RACH slots within a subframe and increasing the number of time domain RACH occasions within a RACH slot.

The WTRU may be explicitly or implicitly configured with resources within the special RACH occasions or expanded RACH occasions that contain both special and regular RACH occasions. In embodiments, the WTRU may be configured to determine its RACH occasion within the expanded set of RACH resources by a distribution mechanism. For example, the WTRU may be configured with a mapping rule between its cell RNTI (C-RNTI) and one or more RACH occasions. In other embodiments, the WTRU may determine its RACH occasion and/or preamble as a function of one or more parameters associated with its dedicated configuration. For example, the WTRU may determine the RACH occasion and/or preamble as a function of its demodulation reference signal (DMRS) configuration. For example, the WTRU may determine its RACH occasion and/or preamble as a function of its physical uplink control channel (PUCCH) configuration and/or physical uplink shared channel (PUSCH) configuration. For example, the WTRU may determine its RACH occasion and/or preamble as a function of its SRS configuration and/or beamFailureRecovery configuration. In embodiments, the RACH occasions and/or preambles may be associated with a specific beam or DL reference signal. In embodiments, the WTRU may be configured to use a beam failure recovery resource to obtain a timing advance after a mobility event. The WTRU may use such resource to indicate an execution of the mobility event.

In embodiments, the WTRU may be configured to apply a transient configuration broadcasted in system information. In an embodiment, the WTRU may not have a dedicated handover command. In a further embodiment, the WTRU may execute handover without a dedicated RACH resource and C-RNTI. The WTRU may determine its RACH occasion using the rule or formula that maps a WTRU identity or a parameter associated with a WTRU dedicated configuration, time domain distribution mechanism, for example, SFN, subframe, slot number, to a RACH occasion. The WTRU may be configured to perform contention based random access (CBRA) and may obtain its C-RNTI from a target cell at handover.

The WTRU may be configured with multiple RACH configurations, and the WTRU may select a subset of the RACH configurations based on a potential timing advance. The WTRU may determine the potential timing advance based on, for example, WTRU location information or satellite ephemeris information.

The WTRU may be configured with a prioritization function associated with a special RACH configuration.

Such prioritization function may include, for example, a configuration for the power ramping step or a scaling factor for a back off indicator. In embodiments, the WTRU may be configured to apply more aggressive power ramping as a part of the transient configuration to speed up the RACH procedure after the mobility event. In other embodiments, the WTRU may be configured to apply a smaller back off as a part of the transient configuration to speed up the RACH procedure after the mobility event.

In embodiments, the special RACH configuration may additionally include a response window configuration to accommodate an increased number of RAR responses.

In embodiments, the WTRU may be configured to apply the transient configuration or parts thereof based on a preconfigured event. For example, the WTRU may apply the transient configuration at a specific time instance. The time instance may be indicated by any of the methods described above. The WTRU may be configured with a start time for a measurement object. For example, the WTRU may start measurements associated with that measurement object at the start time. This start time may correspond to the time at which incoming satellite transmissions or other transmissions are expected. For example, the WTRU may apply the transient configuration associated with UL resources at a specific time instance. The specific time instance may be associated with the special RACH configuration. The WTRU may apply or assume that the special RACH configuration is applicable only after the time instance indicated in the configuration. This may correspond to the time at which the incoming satellite is ready to receive UL transmissions.

In embodiments, the WTRU may be configured with ephemeris data associated with a measurement object. For example, the WTRU may start measurements associated with that measurement object when the satellite location is within a preconfigured threshold based on the ephemeris data information associated with the measurement object. This may correspond to the location and/or time at which incoming satellite transmissions are expected to be received. For example, the WTRU may apply the transient configuration associated with UL resources based on location and/or ephemeris information. The WTRU may be configured with ephemeris information associated with the special RACH configuration. The WTRU may apply or assume that the special RACH configuration is applicable only when the satellite location is within a preconfigured threshold. This may correspond to the location at which an incoming satellite may begin to receive UL transmissions. The preconfigured threshold may be provided to the WTRU by one or more terrestrial base stations, by the satellite, blimp or via other means.

In embodiments, the WTRU may apply the transient configuration upon receiving a paging for sysinfo update. Such sysinfo update may indicate that a special version of system information is to be applied. For example, a predefined or reserved value tag may indicate that a transient configuration should be applied. The WTRU may receive a system information update indication in a paging message which indicates that a transient configuration is available or should be applied. The WTRU may then retrieve the system information comprising the transient configuration. Alternatively, the WTRU may determine that transient configuration should be applied based on an indication that may implicitly indicate a change of cell and/or satellite. For example, by changing cells, the WTRU may detect that system information comprises the transient configuration. Some cells may broadcast a transient configuration while other cells may not. Some WTRUs may be capable of supporting a transient configuration while others may not. Capability information may be reported to cells.

In embodiments, the time at which beams will be steered or a WTRU will be covered by an incoming satellite may be well known a priori, as the movement of satellites is deterministic. The orbital characteristics of the satellite constellation may cause frequent changes of satellite, for example, a low-altitude LEO constellation. To avoid frequency reconfiguration signaling, a WTRU may be configured to apply the transient configuration on a periodic basis. The periodicity may be expressed in terms of a time. Additionally or alternatively, the periodicity may be expressed as a function of SFN modulo x, where the x may be preconfigured. Additionally or alternatively, the periodicity configuration may also include a subframe and/or slot offset. In other embodiments, a location of a transmitter may not be well known a priori, for example, a blimp or other aircraft may require broadcast transmission of location information or the WTRU may determine location via other means.

In embodiments, the WTRU may be configured to set various transmission parameters of an initial transmission at the activation time of a mobility procedure which may involve a change of satellite in a Low Earth orbit satellite (LEOS) and/or a Medium Earth orbit satellite MEOS scenario and/or a change of a serving gateway during a feeder-link switch. Such parameters may enable access without RACH procedure, or alternatively use of shorter preambles for the RACH procedure. The parameters may include at least one of a timing advance, a shift of reception time, a Doppler shift and a transmission power offset.

In embodiments, the WTRU may determine an activation time, expressed in absolute time units or in terms of a combination of HFN and SFN. Additionally or alternatively, the WTRU may determine information for determining change of transmission parameter at the activation time. For example, the WTRU may determine an explicit indication of the change in timing advance, Doppler shift or transmission power. This function is readily applicable in a case where the gateway is changed, but the satellite itself is not changed. This function may also be used where the network has approximate knowledge of the WTRU position. To support this function, a WTRU may report its location to the network periodically or when the location has changed by more than a certain distance since the last report. In another example, the WTRU may determine geographic information for the source and target satellite at an activation time using ephemeris data. Such information may be used in combination with the WTRU position to accurately determine the required parameter, for example, a timing advanced offset. In another example, the WTRU may determine resources for downlink measurement, such as downlink reference signals corresponding to source and target satellite. Such reference signals may be designed such that different scrambling sequences are applied at different time instances where the reference signal may be present. This enables detecting differences in delay larger than the periodicity of each reference signal. The WTRU may infer a difference in transmission delays between the satellites, assuming synchronized clocks between satellites, by comparing the reception times of both reference signals detected using specific scrambling sequences. The WTRU may also estimate a transmission power adjustment based on a difference in received power between the reference signals.

The WTRU may apply frequency compensation prior to a feeder link switch to compensate for a difference in Doppler shift between the link from the SGW to the serving satellite and the link from the serving satellite to the target gateway (TGW). This may occur in a bent pipe configuration where no modulation and/or compensation is performed onboard the satellite. In an embodiment, the frequency different may be detected implicitly by the WTRU via measurements on signals replayed directed from the TGW to the serving satellite. In another embodiment, the WTRU may pre-calculate the expected offset via satellite ephemeris data and data regarding the location of the TGW.

The WTRU may perform measurements on signals directly relayed via the serving satellite ahead of the feeder link switch. In an embodiment where the PCI/SSB combination per spot beam is common between the SGW and the TGW, measurement objects may be separated to enable the WTRU to perform measurements on both channels. This separation may be naturally offset via a difference in propagation delay between the SGW and the TGW. In another embodiment, the TGW may synchronize transmissions with the SGW and transmit measurement objects at a specific offset to the SGW.

The WTRU may be provided with configuration information indicating when to expect DL transmissions from the non-serving gateway. In an embodiment, the WTRU may be preconfigured with a mapping between a DL transmission and the associated gateway. For example, such association may be part of a measurement configuration. Further, the periods of transmission associated with non-serving gateways may be configured to occur in measurement gap with respect to the SGW. In an embodiment, the WTRU may be configured to receive DL transmissions from a non-serving gateway in a BWP different from active BWP associate with the SGW. In another embodiment, the WTRU may perform the HO first based on timing and location, and the measurement may occur after the feeder-link switch.

In an embodiment, if measurements are above a certain threshold, the satellite may begin an RA procedure ahead of the gateway switch. Additionally or alternatively, the WTRU may allow the RACH to move to the next gateway ahead of the gateway switch. The WTRU may transmit measurement results to the network ahead of the feeder link switch using one or more of the routes. Prior to the feeder link switch, the WTRU may simultaneously transmit to both serving and target gateways to avoid data loss in preparation for the feeder link switch.

In embodiments, the WTRU may be configured to perform link reconfiguration instead of re-establishing L2 and/or L3 when the satellite switch impacts only the lower layer functions, such as is the case in bent-pipe 200 and CU-DU split below MAC 230 configurations.

In embodiments, the WTRU may be configured to monitor for beam failure in the source cell while it is configured with one or more candidate beam lists for the source cell, the target cell or both the source cell and the target cell. For example, the WTRU may be configured with a list of candidate beams in the target cell or a mix of beams in the source and the target cell. The RRC reconfiguration with the candidate beam list in the target cell may be transmitted sufficiently early to accommodate the propagation delay and permit the WTRU to detect signals of the target cell. When the WTRU detects beam failure in the source cell, it starts monitoring both candidate beams in the source cell and the target cell or in either based on the configuration of candidate beam list. In another example, the WTRU is configured with two lists of candidate beams: one for the source cell and one for the target cell, which are considered as valid based on a time indication or WTRU location. For example, when the WTRU is less than x meters from the border of the source cell, it considers the candidate beams list of the target cell as activated. Additionally or alternatively, when the current time instance is below y ms from the cell change execution time, the WTRU considers the candidate beams list in the target cell as valid. Further, as soon as the WTRU is configured with one or more candidate beam lists in the target cell, it is configured with dedicated UL/DL BWPs in the target cell and associated CORESETS for PDCCH monitoring. The WTRU then assumes that the PDCCH in the target cell for the beam failure recovery request response is quasi-collocated (QCL) with the reference signal (RS) of the target cell.

In embodiments, for beam indication for PDCCH, the WTRU is configured with N states for each CORESET in the target cell, in addition to being configured by RRC with M states for each CORESET in the serving cell. Using MAC signaling, the network may dynamically indicate a specific Transmission Configuration Indicator (TCI) state in the target cell at the satellite change time to be valid. The RRC configuration for the N states in the target cell may be received immediately at the connection establishment with the current source cell or by means of RRC reconfiguration before the satellite change.

For beam indication for a PDSCH, if the scheduling offset is larger than N symbols, the WTRU may receive, in a DCI for a scheduling assignment, in the target cell, the TCI state for PDSCH transmission. For this purpose, the WTRU is configured with TCI states for both the source cell and the target cell. If the scheduling offset is smaller or equal to N symbols, the WTRU assumes that the TCI state for PDCCH in the target cell indicated by MAC signaling is valid for PDSCH in the target cell. The value of N may be a function of at least one of time instance and WTRU location. For example, a larger value may be used when the WTRU is approaching the cell border or when the satellite/cell change execution time is close, in order to give sufficient time for the WTRU to decode the TCI information within the DCI and adjust the receiver beam towards the target cell before the PDSCH is to be received.

Non-terrestrial networks may need to be capable of supporting both GNSS and non-GNSS capable WTRUs. Given the importance of the WTRU location information in non-terrestrial and/or moving networks, for example, for mobility, tracking area management, and paging, non-GNSS devices may provide some form of location information by one or more means, including, for example, observation of terrestrial cells, calculation based on implicit information and/or based on spatial information from the serving and/or neighbor cells.

Regarding observation of terrestrial cells, a WTRU may detect signals originating from one or more terrestrial cell. Such information may be able to provide an estimate of a WTRU location based on the geographical location of the terrestrial cell and boundary coverage of such a cell or cells.

Regarding calculation based on implicit information, a WTRU may use implicit information broadcast from one or more visible satellites to calculate the WTRU's location. Such information may include, for example, Doppler shift offset, timing advance, satellite ephemeris and/or time. For example, should a WTRU detect the ephemeris data of one or more satellites, an approximate distance to the satellite may be estimated via the timing advance and may be refined with consideration of the Doppler offset which may indicate to the WTRU whether the satellite is moving towards, or receding from, the WTRU. This estimate may be refined via a combination of such information from multiple satellites.

Figure 9:
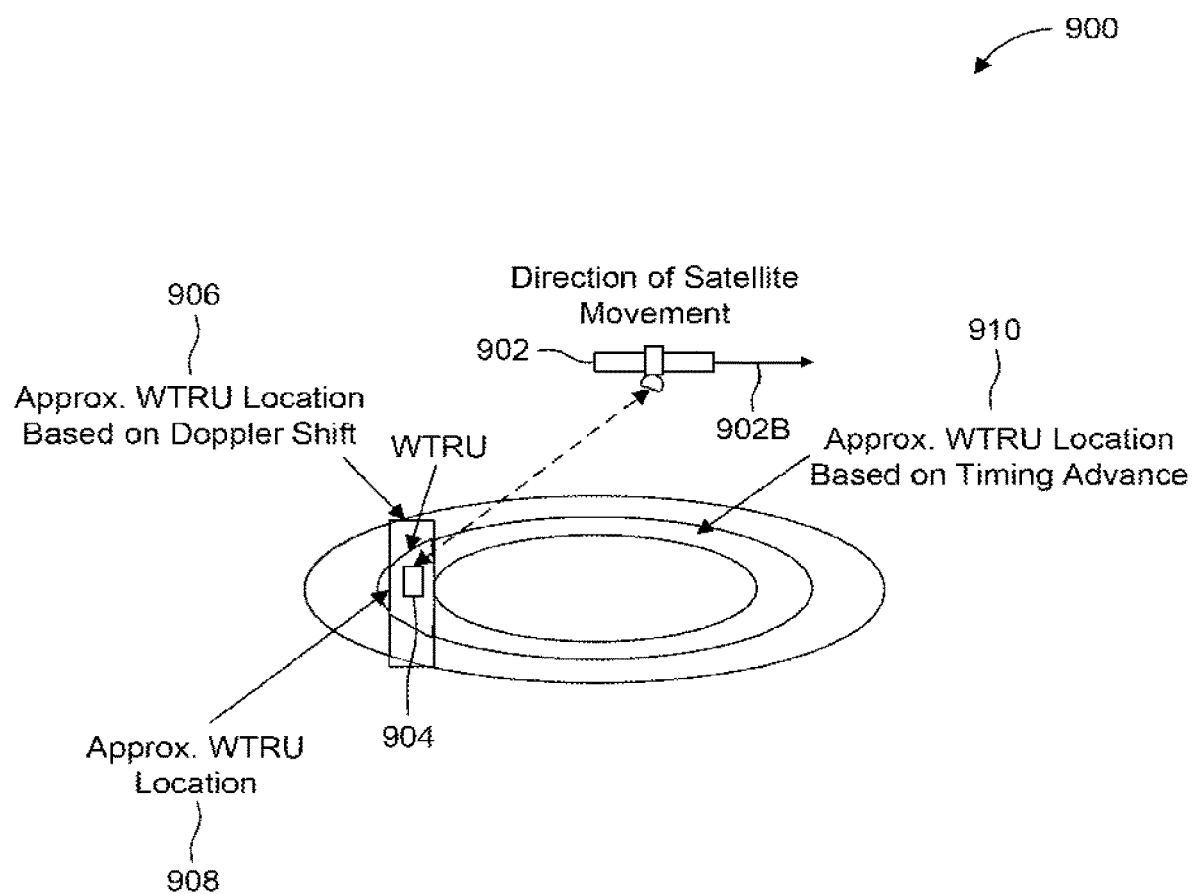
FIG. 9 is a diagram showing an example of an approximate WTRU location derived from implicit measurements and offsets.

FIG. 9 is a diagram showing an example 900 of an approximate WTRU location 908 derived from implicit measurements and offsets. In the example 900, a satellite 902 is moving in a direction 902B. A WTRU 904 may determine an approximate location 908 based on Doppler shift 906 and/or timing advance 910. A WTRU may store or receive a table which reflects Doppler shift to location. A location of the WTRU may be used for determining whether RAN function termination may be imminent. For example, if the WTRU has a table of cells, location, satellite timing and/or other spatial information, the WTRU may determine to employ the procedure of FIG. 10.

Regarding spatial information of or from the serving and/or neighboring cells, a WTRU may estimate its coarse location based on the serving beam received from the serving cell, for example, by determining a PCI or SSB of the cell and comparing it to a table. In embodiments, the WTRU may estimate its location based on TCI state. In embodiments, the WTRU may estimate its location based on SS block and/or CSI-RS measurements. This mechanism may be extended to include beam measurement, such as SSBlock and/or CSI-RS measurements, from the neighbor cells.

Figure 10:
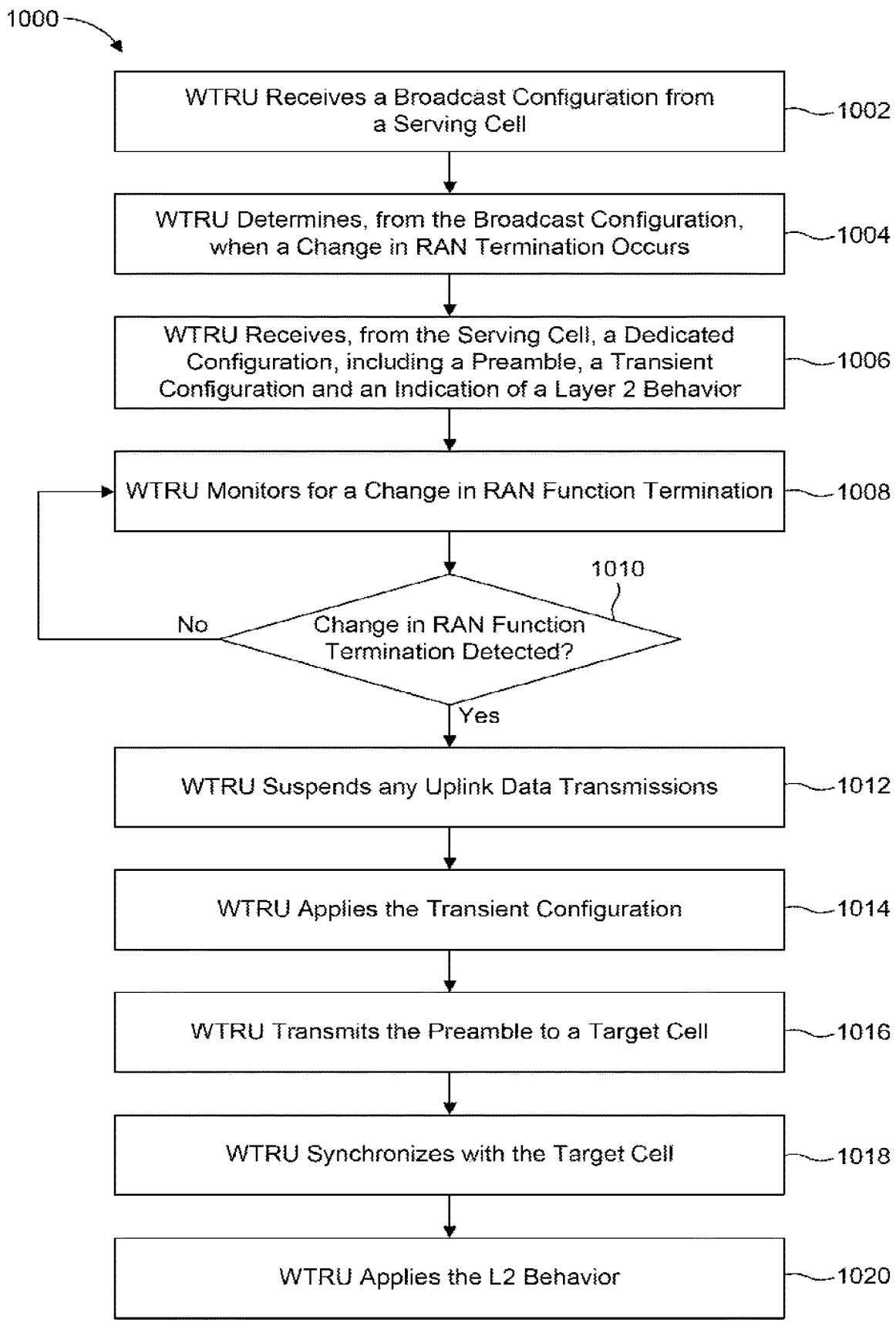
FIG. 10 is a flow diagram showing an example method performed by a WTRU during handover.

FIG. 10 is a flow diagram showing an example method performed by a WTRU during handover. In the example shown in FIG. 10, a WTRU may receive 1002 a broadcast configuration from a serving cell. The serving cell may be a satellite, blimp or other moving object. Alternatively, a serving cell may be a cell of a stationary object, for example, a base station or stationary satellite. The broadcast configuration may be broadcast in system information having a dedicated or non-dedicated broadcast period. The broadcast configuration may be requested by an interested WTRU or by another WTRU. The WTRU may determine 1004, based on the broadcast configuration, when a change in RAN termination occurs or is likely to occur. This determination may be based on a timer, location information, proximity information or the like. The WTRU may receive 1006, from the serving cell or another cell, a dedicated configuration, including a preamble, a transient configuration and an indication of a layer 2 behavior. The WTRU may monitor 1008 for a change in RAN function termination. If a change in RAN function termination is detected 1010, the WTRU may suspend 1012 any pending or scheduled uplink data or control transmissions. The WTRU may apply the transient configuration 1014 and may transmit the preamble 1016 to a target cell. The WTRU may then synchronize with the target cell 1018 and apply 1020 the L2 behavior. If a change in RAN function termination is not detected, the WTRU may continue monitoring 1008 until powered off or until another state change occurs.

There may be devices that remain stationary in a network, such as remote internet-of-things (IOT) sensors including a pipeline and/or one or more devices that remain within a geographically bounded location. Such devices may enable pre-configuration as the location of the device may be assumed to be more or less fixed for a given time. When pre-configuration is used, the devices may have pre-configured locations, which may be stored in memory. The pre-configured location information may be precise or may be a coarse estimate based on some geo-fenced location, for example, a center of a geo-fence boundary.

Due to deterministic movement of satellites, for a given time, which satellites will be covering a specific location may be known. Should a WTRU be stationary or near-stationary, it may be possible to estimate which satellites are available and which is the best candidate to serve the device at a given time of day. Such information may be pre-configured in the devices based on, for example, historical information, and/or may be updated on a semi-period basis, once per day, once per hour or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
receiving, from a non-terrestrial network node, radio resource control (RRC) reconfiguration information, including a trigger condition to trigger an RRC reconfiguration at a future time instance, wherein the trigger condition includes the future time instance, the future time instance including a time offset; and
when the trigger condition is satisfied, executing the RRC reconfiguration;
wherein the future time instance uses coordinated universal time (UTC).

2. The method of claim 1, wherein the trigger condition further includes one or more measurement-based trigger conditions.

3. The method of claim 1, wherein the future time instance is associated with satellite mobility.

4. The method of claim 1, wherein the time offset is a counter.

5. The method of claim 4, wherein the counter indicates a number of time units after the time instance, after which the trigger condition is not satisfied.

6. The method of claim 1, wherein the time offset is a time offset from the future time instance.

7. The method of claim 1, wherein the executing the RRC reconfiguration includes executing a handover to a target cell.

8. A wireless transmit/receive unit (WTRU), comprising:
a transceiver; and
a processor;
wherein the transceiver and processor are configured to:
receive, from a non-terrestrial network node, radio resource control (RRC) reconfiguration information, including a trigger condition to trigger an RRC reconfiguration at a future time instance, wherein the trigger condition includes the future time instance, the future time instance including a time offset; and
when the trigger condition is satisfied, executing the RRC reconfiguration;
wherein the future time instance uses coordinated universal time (UTC).

9. The WTRU of claim 8, wherein the trigger condition further includes one or more measurement-based trigger conditions.

10. The WTRU of claim 8, wherein the future time instance is associated with satellite mobility.

11. The WTRU of claim 8, wherein the time offset is a counter.

12. The WTRU of claim 11, wherein the counter indicates a number of time units until a satellite mobility event.

13. The WTRU of claim 8, wherein the time offset is a time offset from the future time instance.

14. The WTRU of claim 8, wherein the executing the RRC reconfiguration includes executing a handover to a target cell.

* * * * *